US012165633B2

(12) United States Patent
Leong et al.

(10) Patent No.: US 12,165,633 B2
(45) Date of Patent: Dec. 10, 2024

(54) INTELLIGENT TRAINING AND EDUCATION BOT

(71) Applicant: AskWisy, Inc., Los Altos, CA (US)

(72) Inventors: Patrick Pak Tak Leong, Palo Alto, CA (US); Kwok-Cheung Ellis Hung, Saratoga, CA (US)

(73) Assignee: AskWisy, Inc., Los Altos, CA (US)

( * ) Notice: Subject to any disclaimer, the term of this patent is extended or adjusted under 35 U.S.C. 154(b) by 259 days.

(21) Appl. No.: 17/741,370

(22) Filed: May 10, 2022

(65) Prior Publication Data

US 2022/0366896 A1 Nov. 17, 2022

Related U.S. Application Data

(60) Provisional application No. 63/187,398, filed on May 11, 2021.

(51) Int. Cl.
*G10L 15/16* (2006.01)
*G10L 15/06* (2013.01)
*H04L 51/02* (2022.01)

(52) U.S. Cl.
CPC ............ *G10L 15/16* (2013.01); *G10L 15/063* (2013.01); *H04L 51/02* (2013.01)

(58) Field of Classification Search
CPC ........ G06F 40/216; G06F 40/30; G06F 40/35; G06F 40/9535; G06F 3/01; G06F 16/36; G06F 16/9535; G06F 40/51; G06N 20/00; G06N 3/045; G09B 7/02; G09B 9/00; G09B 19/00; G10L 15/063; G10L 15/16; G10L 15/1822; G10L 15/183; G10L 15/197;

(Continued)

(56) References Cited

U.S. PATENT DOCUMENTS

| 10,929,781 B1* | 2/2021 | Choque | G06N 20/00 |
| 11,295,727 B2* | 4/2022 | Mei | G10L 15/183 |
| 11,444,893 B1* | 9/2022 | Kalluri | G10L 15/22 |

(Continued)

OTHER PUBLICATIONS

PCT International Search Report and Written Opinion for International Appln. No. PCT/US22/28646, applicant ASKWISY, Inc., dated Sep. 23, 2022 (26 pages).

*Primary Examiner* — Gerald Gauthier
(74) *Attorney, Agent, or Firm* — Vista IP Law Group, LLP

(57) ABSTRACT

The present disclosure relates to Communicational and Conversational Artificial Intelligence, Machine Perception, Perceptual-User-Interface, and a professional training method. A chatbot may comprise at least one skills module. The chatbot engages with trainee(s) on communicational training on a subject matter provided by the skills module. A trainer may create, remove, or update a skills module with interaction skills and training materials through an onboarding module. A trainee can upload recorded interactions to a skills module for evaluation or for role playing an interaction without a trainer or partner. An administrator may monitor a trainee's performance, and correlate with the organization's metrics. Based on the evaluation, the trainer or chatbot may provide the trainee with feedback and recommended improvement plans. The chatbot may be implemented in an Internet-of-Things or any device. The subject matters may extend to cover different industries/markets. The trainer may be a professional or individual.

27 Claims, 11 Drawing Sheets

(58) Field of Classification Search
CPC ..... G10L 15/22; H04L 12/1827; H04L 51/02; H04R 1/1016; H04W 12/02
See application file for complete search history.

(56) References Cited

U.S. PATENT DOCUMENTS

| | | | | |
|---|---|---|---|---|
| 11,646,013 | B2* | 5/2023 | Tran | G10L 15/1822 |
| | | | | 704/232 |
| 11,709,655 | B2* | 7/2023 | Choi | G06F 3/01 |
| | | | | 704/232 |
| 11,741,956 | B2* | 8/2023 | Chaudhary | G06F 40/30 |
| | | | | 704/232 |
| 2013/0282628 | A1* | 10/2013 | Bengfort | G06F 16/36 |
| | | | | 706/12 |
| 2015/0100303 | A1* | 4/2015 | Danson | G06F 40/30 |
| | | | | 704/9 |
| 2015/0142507 | A1 | 5/2015 | Osman et al. | |
| 2017/0270822 | A1 | 9/2017 | Cohen | |
| 2018/0090137 | A1* | 3/2018 | Horling | G06F 16/9535 |
| 2018/0240015 | A1* | 8/2018 | Martin | G06N 3/045 |
| 2018/0247549 | A1* | 8/2018 | Martin | G09B 19/00 |
| 2019/0107990 | A1 | 4/2019 | Spivack et al. | |
| 2019/0198011 | A1* | 6/2019 | Kerr | G09B 9/00 |
| 2019/0251859 | A1* | 8/2019 | Xu | G09B 7/02 |
| 2019/0266240 | A1 | 8/2019 | Georges et al. | |
| 2019/0341036 | A1* | 11/2019 | Zhang | G06F 40/35 |
| 2020/0160437 | A1* | 5/2020 | Singh | H04L 51/02 |
| 2021/0125089 | A1* | 4/2021 | Nickl | H04W 12/02 |
| 2021/0304075 | A1* | 9/2021 | Duong | G10L 15/197 |
| 2022/0114914 | A1* | 4/2022 | Genesis | G06F 40/51 |
| 2022/0139382 | A1* | 5/2022 | Shi | G10L 15/16 |
| | | | | 704/232 |
| 2022/0139383 | A1* | 5/2022 | Rose | H04L 12/1827 |
| | | | | 704/232 |
| 2022/0255885 | A1* | 8/2022 | Aharoni | G06F 40/35 |
| 2022/0319181 | A1* | 10/2022 | Kanuganti | G09B 7/02 |
| 2022/0366896 | A1* | 11/2022 | Leong | H04L 51/02 |
| 2022/0415202 | A1* | 12/2022 | Venkatasubramanyam | |
| | | | | G06N 20/00 |
| 2023/0186916 | A1* | 6/2023 | Yang | G10L 15/16 |
| | | | | 704/232 |
| 2023/0186917 | A1* | 6/2023 | Volovich | H04R 1/1016 |
| | | | | 704/232 |
| 2023/0298579 | A1* | 9/2023 | Vaidya | G06N 3/045 |
| | | | | 704/232 |

* cited by examiner

INTELLIGENT TRAINING AND EDUCATION BOT

RELATED APPLICATION DATA

This application claims priority to, and the benefit of U.S. Provisional Patent Application No. 63/187,398 filed on May 11, 2021. The entire disclosure of the above application is expressly incorporated by reference herein.

FIELD

The field relates to devices and methods for training and educating users, and more particularly, to devices and methods for training and educating users to communicate in certain subject areas.

BACKGROUND

The advance of natural language processing in artificial intelligence, and technologies in machine perception and Perceptual User Interface (PUI) such as facial and gesture recognition, allow the understanding of the intent of a conversation from a speaker's utterances, facial expressions, and gestures. In some cases, these technological advances also allow prediction of a user's behavior based on the user's actions and body languages. Smart chatbots may be implemented using the above technologies, which allow a human user to carry out a conversation with a machine using either voice, text, rich media methods such as video, or other sensors data.

Currently, most chatbot applications are focused on simple online technical support, simple form completion, or simple online sales assistance. The scope of the conversation is very limited, and, in many cases, there must be a live person at the back-end ready to take over chatting with the user if the chatbot cannot handle the conversation.

Many professional trainings involve a trainer chatting with one or more trainees on a specific subject, and the trainee is expected to learn and master the skills of a conversation on the specific subject matter. For example, in real-estate agent on-boarding, a trainer may role-play to be a potential client of a real-estate agent and engages the real-estate agent trainee with conversations that the trainee is expected to answer and act professionally under different circumstances to build up rapport and/or to close a business transaction such as a house-sale listing contract. Oftentimes the trainer has limited time available to work with all trainees, and a trainee may find it difficult to find someone who has the time and willingness to engage with such conservations and practices. For example, experienced real-estate agents may not be fully open to training new-comers because of the perception that the new-comers will eventually become their competitors.

In many professional training situations, the training content may become stale overtime or may not be sensitive to the local environment. For example, a conversation between a real-estate agent and a potential client may require the most up-to-date information about the subject property such as local laws just passed by the city council or a local tax increment.

Furthermore, current chatbot applications cannot understand the true intent of a user based on facial expressions, gestures, body languages or the change of tone in voice.

Many trainers, although they may be experts in their respective fields, may not be technically savvy enough to build a chatbot to deliver their trainings with the current chatbot technologies. This creates a hurdle for the efficient dissemination of the trainers' knowledge.

SUMMARY

The present invention relates to using a computer system and software running in a computer system that can understand human conversations and can perform professional training or learning.

In one embodiment, the computer software can be a smart chatbot that can understand human conversation and identify each dialog's intents and utterances based on the text, voice, rich media inputs such as audio and video inputs, or other sensors data, and can, based on some professional knowledge, provide intelligent responses to the human user engaged in the conversation such that a training session can be conducted. The content of the conversation may be analyzed for the quality of the human responses and provide feedback to the human user from a training perspective. The chatbot may also send the content of the conversation to an artificial intelligence analysis engine for getting deeper insights about the conversation or improve the natural language processing and machine perception capability of the chatbot through machine learning, deep learning, and other artificial intelligence technologies. The trainee may upload his or her recorded conversation with another human being to this chatbot for training critique. The trainee may also use such recorded conservations or other recorded media available on the Internet for role-play practices, during which the chatbot can be configured to role-play with various character traits. The chatbot software in this invention may be marketed as a virtualized trainer or coach assistant with advanced intelligence.

The professional training software and its data can be modularized into a multiple of training skills modules such that all trainings can share the same chatbot interface and workflow. In one embodiment, a skills module can be a skills bot that can run independently as a chatbot. In another embodiment, a skills module can be a logical module or an entity with chatbot capability that provides specific skills. The professional training information in the skills modules may be updated in real-time based on the most current news, local laws, or environmental information. This professional training software may allow the trainee of a chatbot conversation to further schedule an online live training, or an offline live in-person training at a specific place and time.

The professional training software in this invention may allow persons with administrative rights over the trainees to monitor the progress of each individual trainee, and to map and analyze the performance of the trainee in the trained activity against the amount of time the trainee has spent on using the training software, the trainee's performance in the trainings, and the revenue that a trainee may bring to an organization.

In an example embodiment of this invention, the chatbot may be able to take in voice or video inputs and be able to detect the facial expression, gesture, body language, tone, and the change of tone in a conversation such that appropriate responses can be generated in the conversation.

The current invention may have example embodiments in professional training such as real-estate agent onboarding, salesforce onboarding, crisis management counseling, or any other type of professional training that requires learning the skills of how to conduct a proper conversation. The current invention may also have example embodiments in kindergarten to 12th grade (K-12) learning, such as introducing and teaching subject matters that are not in the regular school curriculum but can broaden the educational perspective of a student. Examples of such subject matters include personal finance management, soft skills in a workplace and so on.

The current invention allows a trainer to fully utilize his or her time and skills such that the trainer may be able to train more trainees within a given amount of time. From the trainee's perspective, the current invention allows conversation practice opportunities with a chatbot such that his or her professional skills can be improved. It also solves the issue of a trainee not able to find access to a trainer or that fellow co-workers of the trainee may not be willing to help the trainee due to perceived competitions once the trainee is trained. The capability of the chatbot to schedule online or offline in-person training allows the human to further get customized tutoring and can provide timely help and encouragement to K-12 school children if they are finding certain subjects or homework difficult.

Example embodiments of the above computer system and software may also include, but not limited to, hosting the software inside an Internet of Things (IoT) device, a robot, or a toy.

A product for training a user to communicate in a subject area, the product includes: an output configured to provide a first communication output for presentation to the user during a training session; an input configured to obtain a communication input representing or indicating a communication action performed by the user in response to the first communication output during the training session; a processing unit comprising a communication module configured to process the communication input to determine a second communication output for presentation to the user during the training session; and an evaluator configured to evaluate a communication performance of the user.

Optionally, the communication module comprises a neural network model and/or a machine learning model.

Optionally, the neural network model and/or the machine learning model is trained based on a data set having a set of words associated with a communicational intent.

Optionally, the neural network model and/or the machine learning model is configured to provide a metric indicating a probability of an intent based on the communication input, and wherein the processing unit is configured to determine the second communication output based on the metric.

Optionally, the processing unit is configured to determine the second communication output based on the metric and using an algorithm that comprises a set of pre-defined and/or data-driven rules.

Optionally, the product is configured to role-play with the user without a presence of a human trainer.

Optionally, the processing unit is configured to determine an intent of the user based on the communication input.

Optionally, the processing unit is configured to determine the second communication output for responding to the user based on the determined intent of the user.

Optionally, the processing unit is configured to determine the second communication output for responding to the user also based on a level of difficulty at which the user is being trained.

Optionally, the evaluator is configured to determine a metric indicating the communication performance of the user.

Optionally, the evaluator is configured to determine the metric based on a degree of coverage of topics in the subject area.

Optionally, the evaluator is configured to determine the metric based on whether a state of a communication between the user and the product satisfies a pre-defined or data-driven criterion.

Optionally, the product is configured to simulate a person to interact with the user.

Optionally, the person is a property owner, and the product is configured to simulate the property owner to interact with the user, and wherein the product is configured to train the user as a real estate agent to interact with the property owner.

Optionally, the person is a real estate agent, and the product is configured to simulate the real estate agent to interact with the user, and/or to show the user how a model real estate agent responds to one or more situations.

Optionally, the processing unit comprises a graphic generator configured to provide an image simulating an environment of a property.

Optionally, the product is configurable by a real-estate agent, a real-estate broker, or a real-estate agent trainer.

Optionally, the subject area includes one or more topics selected from the group consisting of: pre-qualifying a potential client, listing presentation, objections handling, just-listed solicitation, just-sold solicitation, open-house conversation, for-sale-by-owner conversation, expired-listing conversation, lead generation, business development, and a transaction-related topic.

Optionally, the product is configured to simulate a school teacher, a parent, a counselor, or an individual who is interested in passing some knowledge.

Optionally, the product is configured to train the user as a student in a grade level that is anywhere from kindergarten to 12th grade.

Optionally, the subject area is an academic subject.

Optionally, the subject area is a non-academic subject.

Optionally, the subject area may be business, finance, technology, legal, retail, recruiting, medicine, dating, or any subject area for which training is needed.

Optionally, in a first mode of operation, the product is configured to simulate a first person in a first role to interact with the user in a second role; and wherein in a second mode of operation, the product is configured to simulate a second person in the second role to interact with the user in the first role.

Optionally, the product is configured to simulate multiple persons in different respective roles to interact with the user during the training session.

Optionally, the product is configured to simulate a person to interact with the user and another user during the training session.

Optionally, the product is configured to simulate multiple persons in different respective roles to interact with multiple users during the training session.

Optionally, the communication module comprises a speech generator configured to generate speech signals based on the second communication output.

Optionally, the communication module comprises a gesture generator configured to generate gesture signals based on the second communication output.

Optionally, the processing unit comprises a research module configured to search the Internet, and assemble relevant training information for training the user in the subject area.

Optionally, the search module is configured to search the Internet based on the communication input.

Optionally, the search module is configured to search the Internet for information based on a locality related to the user.

Optionally, the communication module is configured to learn to interact with the user in the subject area.

Optionally, the product is configured to provide a user interface for allowing an administrator or the user to create the communication module and/or to update the communication module.

Optionally, the product is configured to update the communication module based on news, location of the user, an environment around the user, or any combination of the foregoing.

Optionally, the first communication output, the communication input, and the second communication output form an interaction between the user and the product, and wherein the processing unit comprises a recorder configured to record the interaction.

Optionally, the interaction comprises a conversation between the user and the product, and the recorder is configured to record the conversation.

Optionally, the interaction comprises a gesture of the user, and the recorder is configured to record the gesture of the user.

Optionally, the processing unit comprises a script generator configured to generate a script of the recorded conversation.

Optionally, the processing unit comprises a playback module configured to playback the recorded interaction.

Optionally, the processing unit comprises a progress monitor configured to monitor a training progress of the user.

Optionally, the progress monitor is configured to correlate the training progress with a business parameter.

Optionally, the business parameter is revenue contributed by the user or sales funnel information, and wherein the progress monitor of the product is configured to correlate the training progress of the user with the revenue contributed by the user or with the sales funnel information.

Optionally, the communication action comprises a speaking action, and the communication input comprises an audio signal representing speech associated with the speaking action.

Optionally, the communication action comprises a speaking action, and the communication input comprises text derived from speech associated with the speaking action.

Optionally, the communication action comprises a making of a gesture, and the communication input comprises an image or a classification indicating the gesture.

Optionally, the output of the product is configured to communicate with a speaker, a display, a virtual reality device, an augmented reality device, or any combination of the foregoing.

Optionally, the product comprises a communicational artificial intelligence system.

Optionally, the product is a chatbot.

Optionally, the product is an Internet-of-Things (IoT) device, a robot, a toy, or an elderly-assist device.

Optionally, the product is implemented in a server.

Optionally, the product is implemented in a hand-held device.

Optionally, the product is implemented in a wearable device (e.g., virtual reality device, augmented reality device, neck-loop, helmet, etc.).

Optionally, the product further includes a feedback module configured to provide feedback information indicating a communication area that needs improvement, and/or a suggestion regarding a next communication training session.

A method performed by a product to train a user to communicate in a subject area, includes: providing, by an output of the product, a first communication output for presentation to the user during a training session; obtaining, by an input of the product, a communication input representing or indicating a communication action performed by the user in response to the first communication output during the training session; processing, by a communication module in a processing unit of the product, the communication input to determine a second communication output for presentation to the user during the training session; and evaluating, by an evaluator of the product, a communication performance of the user.

Optionally, the processing unit comprises a neural network model and/or a machine learning model, and wherein the act of processing the communication input to determine the second communication output is performed by the neural network model and/or the machine learning model.

Optionally, the neural network model and/or the machine learning model is trained based on a data set having a set of words associated with a communicational intent.

Optionally, the second communication output is determined by obtaining a metric indicating a probability of an intent based on the communication input, and determining the second communication output based on the metric.

Optionally, the second communication output is determined based on the metric and an algorithm that comprises a set of pre-defined and/or data-driven rules.

Optionally, the product is configured to role-play with the user without a presence of a human trainer.

Optionally, the act of processing the communication input comprises determining an intent of the user based on the communication input.

Optionally, the second communication output is for responding to the user, and wherein the second communication output is based on the determined intent of the user.

Optionally, the second communication output for responding to the user is determined also based on a level of difficulty at which the user is being trained.

Optionally, the act of evaluating comprises determining a metric indicating the communication performance of the user.

Optionally, the metric is determined based on a degree of coverage of topics in the subject area.

Optionally, the metric is determined based on whether a state of a communication between the user and the product satisfies a pre-defined or data-driven criterion.

Optionally, the act of providing the first communication output is performed to simulate a person to interact with the user.

Optionally, the person is a property owner, and the product is configured to simulate the property owner to interact with the user, and wherein the product is configured to train the user as a real estate agent to interact with the property owner.

Optionally, the person is a real estate agent, and the product is configured to simulate the real estate agent to interact with the user, and/or to show the user how a model real estate agent responds to one or more situations.

Optionally, the method further includes providing, by a graphic generator, an image simulating an environment of a property.

Optionally, the method further includes providing a user interface for allowing a real-estate agent, a real-estate broker, or a real-estate agent trainer, to configure the product.

Optionally, the subject area includes one or more topics selected from the group consisting of: pre-qualifying a potential client, listing presentation, objections handling, just-listed solicitation, just-sold solicitation, open-house conversation, for-sale-by-owner conversation, expired-listing conversation, lead generation, business development, and a transaction-related topic.

Optionally, the act of providing the first communication output is performed to simulate a school teacher, a parent, a counselor, or an individual who is interested in passing some knowledge.

Optionally, the product is configured to train the user as a student in a grade level that is anywhere from kindergarten to 12th grade.

Optionally, the subject area is an academic subject.

Optionally, in the method, the subject area is a non-academic subject.

Optionally, in the method, the subject area may be business, finance, technology, legal, retail, recruiting, medicine, dating, or any subject area for which training is needed.

Optionally, in a first mode of operation, the product is configured to simulate a first person in a first role to interact with the user in a second role; and wherein in a second mode of operation, the product is configured to simulate a second person in the second role to interact with the user in the first role.

Optionally, in the method, the product is configured to simulate multiple persons in different respective roles to interact with the user during the training session.

Optionally, in the method, the product is configured to simulate a person to interact with the user and another user during the training session.

Optionally, in the method, the product is configured to simulate multiple persons in different respective roles to interact with multiple users during the training session.

Optionally, the method further includes generating, by a speech generator, speech signals based on the second communication output.

Optionally, the method further includes generating, by a gesture generator, gesture signals based on the second communication output.

Optionally, the method further includes searching the Internet, by a research module, and assembling relevant training information for training the user in the subject area.

Optionally, the act of searching the Internet is performed based on the communication input.

Optionally, the Internet is searched for information based on a locality related to the user.

Optionally, the method further includes learning, by the communication module, to interact with the user in the subject area.

Optionally, the method further includes providing a user interface for allowing an administrator or the user to create the communication module and/or to update the communication module.

Optionally, the method further includes updating the communication module based on news, location of the user, an environment around the user, or any combination of the foregoing.

Optionally, the first communication output, the communication input, and the second communication output form an interaction between the user and the product, and wherein the method further comprises recording, by a recorder, the interaction.

Optionally, the interaction comprises a conversation between the user and the product, and wherein the act of recording the interaction comprises recording the conversation.

Optionally, the method further includes generating a script of the recorded conversation.

Optionally, the method further includes playing back the recorded interaction.

Optionally, the method further includes monitor, by a progress monitor, a training progress of the user.

Optionally, the method further includes correlating the training progress with a business parameter.

Optionally, the business parameter is revenue contributed by the user or sales funnel information, and wherein the act of correlating the training progress with the business parameter comprises correlating the training progress of the user with the revenue contributed by the user or with the sales funnel information.

Optionally, the communication action comprises a speaking action, and the communication input comprises an audio signal representing speech associated with the speaking action.

Optionally, the communication action comprises a speaking action, and the communication input comprises text derived from speech associated with the speaking action.

Optionally, the communication action comprises a making of a gesture, and the communication input comprises an image or a classification indicating the gesture.

Optionally, the method further includes communicating with a speaker, a display, a virtual reality device, an augmented reality device, or any combination of the foregoing.

Optionally, the product is a communicational artificial intelligence system, and wherein the method is performed by the communicational artificial intelligence system.

Optionally, the product is a chatbot, and wherein the method is performed by the chatbot.

Optionally, the product is an Internet-of-Things (IoT) device, a robot, a toy, or an elderly-assist device; and wherein the method is performed by the IoT device, the robot, the toy, or the elderly-assist device.

Optionally, the product is implemented in a server, and wherein the method is performed by the server.

Optionally, the product is implemented in a hand-held device, and wherein the method is performed by the hand-held device.

Optionally, the product is implemented in a wearable device (e.g., virtual reality device, augmented reality device, neck-loop, helmet, etc.), and wherein the method is performed by the wearable device.

Optionally, the method further includes providing feedback information indicating a communication area that needs improvement, and/or a suggestion regarding a next communication training session.

A product includes a non-transitory medium storing a set of instructions, an execution of which will cause a method to be performed, the method comprising: providing, by an output, a first communication output for presentation to the user during a training session; obtaining, by an input, a communication input representing or indicating a communication action performed by the user in response to the first communication output during the training session; processing, by a communication module, the communication input to determine a second communication output for presentation to the user during the training session; and evaluating, by an evaluator, a communication performance of the user.

A communication training product includes: an input configured to obtain a communication input that is associated with a communication action performed by a user of the product during a training session; a neural network model and/or a machine learning model configured to process speech information and/or sensor data in the communication input to determine an intent of the user, the determined intent being associated with the speech information and/or the sensor data; and a processing module coupled downstream with respect to the neural network model and/or the machine learning model, wherein the processing module is configured to determine a communication output based on the determined intent for presentation to the user during the training session; wherein the processing module is configured to operate based on an algorithm that associates different reference intents with respective responses, and wherein the processing module is configured to select one of the responses as the communication output based on a matching of the detected intent with the corresponding one of the reference intents, and wherein the selected one of the responses is designed to train the user to communicate in a particular subject area.

Optionally, the communication training product comprises both the neural network model and the machine learning model.

Optionally, the neural network model is configured to process the speech information.

Optionally, the machine learning model is configured to process the sensor data, and wherein the sensor data comprises non-audio data.

Optionally, the communication training product includes an evaluator is configured to determine a metric indicating a communication performance of the user.

Optionally, the evaluator is configured to determine the metric based on a degree of coverage of topics in the subject area.

Optionally, the evaluator is configured to determine the metric based on whether a state of a communication between the user and the product satisfies a pre-defined or data-driven criterion.

Optionally, the communication training product further includes a research module configured to search the Internet, and assemble relevant training information for training the user in the subject area.

Optionally, the communication output and the communication input form an interaction between the user and the communication training product, and wherein the communication training product comprises a recorder configured to record the interaction.

Optionally, the communication training product further includes a feedback module configured to provide feedback information indicating a communication area that needs improvement, and/or a suggestion regarding a next communication training session.

Optionally, the communication training product comprises a communicational artificial intelligence system.

A communication training method includes: obtaining, by an input of a product, a communication input that is associated with a communication action performed by a user of the product during a training session; processing, by a neural network model and/or a machine learning model, speech information and/or sensor data in the communication input to determine an intent of the user, the determined intent being associated with the speech information and/or the sensor data; and determining, by a processing module coupled downstream with respect to the neural network model and/or the machine learning model, a communication output based on the determined intent for presentation to the user during the training session; wherein the act of determining the communication output is performed based on an algorithm that associates different reference intents with respective responses; and wherein the act of determining the communication output comprises selecting one of the responses as the communication output based on a matching of the detected intent with the corresponding one of the reference intents, and wherein the selected one of the responses is designed to train the user to communicate in a particular subject area.

Optionally, the communication training product comprises both the neural network model and the machine learning model.

Optionally, the speech information is processed by the neural network model.

Optionally, the sensor data comprises non-audio data, and wherein the sensor data is processed by the machine learning model.

Optionally, the communication training method further includes determining, by an evaluator, a metric indicating a communication performance of the user.

Optionally, the metric is determined based on a degree of coverage of topics in the subject area.

Optionally, the metric is determined based on whether a state of a communication between the user and the product satisfies a pre-defined or data-driven criterion.

Optionally, the communication training method further includes searching, by a research module, the Internet, and assembling relevant training information for training the user in the subject area.

Optionally, the communication output and the communication input form an interaction between the user and the communication training product, and wherein the method further comprises recording the interaction.

Optionally, the communication training method further includes providing, by a feedback module, feedback information indicating a communication area that needs improvement, and/or a suggestion regarding a next communication training session.

Optionally, product comprises a communicational artificial intelligence system, and wherein the communication training method is performed by the communicational artificial intelligence system.

A product includes a non-transitory medium storing a set of instructions, an execution of which will cause a method to be performed, the method comprising: obtaining, by an input of a product, a communication input that is associated with a communication action performed by a user of the product during a training session; processing, by a neural network model and/or a machine learning model, speech information and/or sensor data in the communication input to determine an intent of the user, the determined intent being associated with the speech information and/or the sensor data; and determining, by a processing module coupled downstream with respect to the neural network model and/or the machine learning model, a communication output based on the determined intent for presentation to the user during the training session; wherein the act of determining the communication output is performed based on an algorithm that associates different reference intents with respective responses; and wherein the act of determining the communication output comprises selecting one of the responses as the communication output based on a matching of the detected intent with the corresponding one of the reference intents, and wherein the selected one of the responses is designed to train the user to communicate in a particular subject area.

A communication training product includes: an input configured to obtain a communication input that is associated with a communication action performed by a user of the product during a training session; a communication module configured to process the communication input to determine an intent of the user, and determine a communication output based on the determined intent for presentation to the user during the training session; and an evaluator configured to determine a communication performance of the user based at least in part on how well the user communicate in a subject area, a facial expression of the user detected during the training session, a gesture of the user detected during the training session, or any combination of the foregoing.

A communication training method includes: obtaining, by an input of a product, a communication input that is associated with a communication action performed by a user of the product during a training session; processing, by a communication module of the product, the communication input to determine an intent of the user; determining a communication output based on the determined intent for presentation to the user during the training session; and determining, by an evaluator of the product, a communication performance of the user based at least in part on how well the user communicate in a subject area, a facial expression of the user detected during the training session, a gesture of the user detected during the training session, or any combination of the foregoing.

A product includes a non-transitory medium storing a set of instructions, an execution of which will cause a method to be performed, the method comprising: obtaining, by an input of a product, a communication input that is associated with a communication action performed by a user of the product during a training session; processing, by a communication module of the product, the communication input to determine an intent of the user; determining a communication output based on the determined intent for presentation to the user during the training session; and determining, by an evaluator of the product, a communication performance of the user based at least in part on how well the user communicate in a subject area, a facial expression of the user detected during the training session, a gesture of the user detected during the training session, or any combination of the foregoing.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings.

Understanding that these drawings depict only exemplary embodiments and are not therefore to be considered limiting in the scope of the claimed invention.

DESCRIPTION OF THE EMBODIMENTS

Figure 1:
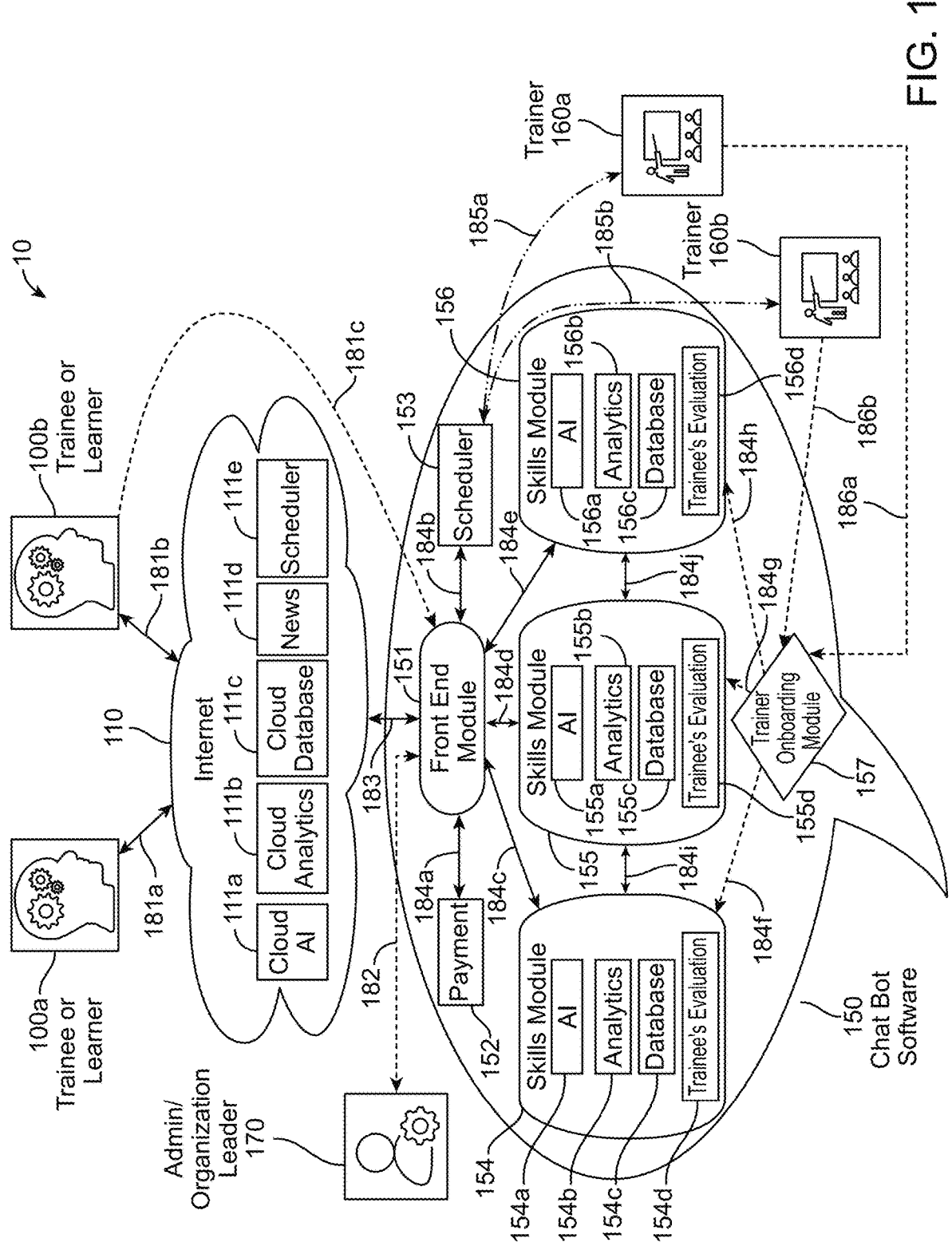
FIG. 1 illustrates a product configured to provide communication training in accordance with some embodiments.

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

The present disclosure generally relates to artificial intelligence natural language processing technology, machine perception technology, and Perceptual User Interface (PUI) technology, and more specifically to a chatbot and enhancing learning and professional training efficiencies utilizing a chatbot.

The following description is presented to enable one of ordinary skill in the art to make and use the claimed invention and is provided in the context of a patent application and its requirements. Various modifications to the preferred embodiments and the generic principles and features described herein will be readily apparent to those skilled in the art. Thus, the claimed invention is not intended to be limited to the embodiments shown, but is to be accorded the widest scope consistent with the principles and features described herein.

While preferred embodiments have been shown and described herein, it will be obvious to the skilled in the art that such embodiments are provided by way of example only. Numerous variations, changes, and substitutions will occur to those skilled in the art without departing from the scope of the claimed invention.

To describe the features of the embodiments in more detail, refer now to the following discussion in conjunction with the accompanying figures.

In a system and method in accordance with some embodiments, a computer system and software are designed to enable a trainer to engage in training activities with one or more trainees without the presence of the trainer. In a preferred embodiment, the training can be communication skills (e.g., converse skills, gesture skills, expression skills, etc.) with respect to a specific subject matter or business opportunity. For example, a training can be part of a real-estate agent onboarding at which the real-estate agent (trainee) practices a conversation for pre-qualifying a potential client, listing presentation, objections handling, just-listed or just-sold solicitations, open-house conversation, for-sale-by-owner conversation, expired-listing conversation, or any combination of the foregoing. In a preferred embodiment, the training can be carried out by a product (e.g., a chatbot, which is a software running in a computer system) that can engage with a communication with a human. The communication can take text, voice, or video as inputs. In some cases, the inputs may include rich media and/or sensor(s) data, including but not limited to input generated using hyperlink buttons, choice boxes, selection lists, virtual reality device, augmented reality device, etc.

There are four elements of a chatbot conversation. They are intent, utterances, entities, and stories. Intent is the speaker's intention over a text, audio or video sentence, and/or body language. Utterances are whatever the speaker says, types, or acts in realization of that intention. In any conversation, there can be more than one utterance per intent. For example, if the intent is to find out the current weather condition, an utterance can be "What is the weather like outside?" or "Is outside hot or cold?". Oftentimes the tone and/or body language (or the change of tone, and/or change in body language) in a conversation may reveal a different intent or show the true intent. Entities are meta data about an intent. In the example above, "weather" and "outside" are the entities. Stories are dialog flows for the chatbot. For a given intent identified from an incoming utterance, together with its identified entities, a story determines how the chatbot should respond.

In a professional training situation such as a real-estate agent onboarding, it is important that a new real-estate agent has sufficient practices on how to handle the responses of a potential client or client to facilitate closing a business transaction. For example, a potential client may complain about the agent fee being too high, or that they may want to negotiate a significant discount in agent fee by proposing having the same agent to sell the current house and to buy a new one. Such conversations may exemplify themselves with a multiple of different utterances against the same intent, and the tonal and gestural nature of the conversation may reveal whether the potential client is in doubt, frustrated or showing rapport and agreement. Most trainers have accumulated enough experience in handling such situations that they can teach new real-estate agents what is the best response for each situation. However, currently access to the time of a trainer is limited, and not every experienced real-estate agent is willing to train his or her peers due to the perceived competition to new deals once a new agent is trained. From a business owner's (such as a real estate broker's) perspective, having more agents who are trained to engage in professional conversations with potential clients may increase the overall revenue of the organization. Hence making such professional trainings highly available and scalable will be beneficial.

FIG. 1 shows a product 10 that is configured to provide communication training in some embodiments. In the illustrated embodiments, product 10 includes a professional training software in the form of a chatbot 150 running in a computer system. The chatbot 150 may be hosted in a cloud server over the Internet 110, or it may be hosted at a private server of an individual, a company, or an organization. The trainee or learner (users) 100a-100b can access the chatbot via an application on a smartphone, tablet, or computer. In some embodiments, the produce 10 may provide an interface for allowing users to login and/or to authenticate users. In other embodiments, the users may access the chatbot via a standard API such as RUST, or via some established social media channels' apps such as from Facebook, Microsoft Team, Twitter, or Slack. Also, in some embodiments, the users may be authenticated via such social media channels using Open-Authentication.

In some embodiments, the chatbot 150 may have a common front-end interface 151 to all users such that there is a consistent look-and-feel and user experience, with a multiple of skills modules 154-156 inside or associated with the chatbot 150. Each skills module 154/155/156 handles training in a specific subject area, and communicates with the trainee via the chatbot 150. For training in communication skills, the chatbot 150 can enable role-playing with the trainee, with the chatbot 150 being able to play on either side of a communication. For communication that the trainee is expected to respond in certain professional manner, the chatbot 150 may play the counter-role with different configurable characters, mimicking a real-world situation.

In the illustrated example, three skills modules 154, 155, 156 are shown. In other embodiments, the product 10 may have more than three skills modules, or fewer than three skills modules (e.g., one skills module).

The trainees or learners 100a, 100b may log in and connect to the chatbot software 150 via a local computer network 181c, or remotely through connections 181a, 181b via the Internet 110. Trainers 160a, 160b may easily create their skills modules via a trainer onboarding module 157. As shown in the figure, the trainers 160a, 160b may access the trainer onboarding module 157 via respective communication channels 186a, 186b (which may be wired communication channels or wireless communication channels).

In some embodiments, a training session with a trainee may be performed using artificial intelligence software 154a/155a/156a implemented in the corresponding skills module 154/155/156. By means of non-limiting examples, the artificial intelligence software may include natural language processing software, video analysis software for facial expression, gesture, and body language interpretations, machine perception, perceptual user interface (PUI), etc. As shown in the figure, the skills module 154/155/156 also includes corresponding analytics software 154b/155b/156b and database 154c/155c/156c. In some embodiments, the analytics software is configured to process output provided by the corresponding artificial intelligence software, communication input provided by the trainee during a training session, researched information regarding a certain subject area, and/or any of other types of information and/or data that may be helpful in implementing communication training for the trainee. The database 154c/155c/156c is configured to store information involved in the operation of the skills module 154/155/156. Each skills module 154/155/156 also has an evaluation module (evaluator) 154d/155d/156d configured to evaluate a trainee's performance in the trainings.

In some cases, a skills module (e.g., any of the skills modules 154, 155, 156) may call on other skills module(s). For examples, skills module 154 may call skills module 155 (as represented by arrow 184i), and skills module 155 may call skills module 156 (as represented by arrow 184j). In some cases, skills module 154 may directly call skills modules 156. The ability to call other skills modules is advantageous because it allows the chatbot 150 to communicate with users in different subject areas during training session(s). For example, the skills module 154 may be configured to provide communication training to train a user in the area of pre-qualifying a prospective client in real estate transactions. While the user is communicating (e.g., conversing, making facial expression, gesturing, or any combination of the foregoing) with the chatbot in this subject area, the communication may take a directional turn into a different subject area of loan transaction. In such cases, the skill module 154 may call on another skill module that is specifically configured to provide training in the subject area of loan transaction.

As shown in the figure, the product 10 may be communicatively coupled to the Internet via connection 183. The product 10 may search the Internet 110 to obtain information relevant to certain communication subject areas, and the skills module 154/155/156 may utilize any of such information when communicating with the trainee 100a/100b. By means of non-limiting examples, the information from the Internet 110 may be information from cloud AI 111a, information from cloud analytics 111b, information from cloud database 111c, news 111d, information from scheduler 111e, or any combination of the foregoing. Information from scheduler 111e may be any information from a trainee's or trainee agent's calendar. For example, the product 10 may obtain information from the trainee's calendar to make sure there are regular training sessions, and/or may provide some assistance in scheduling an appointment with a client.

In addition, the administrator, owner, or leader 170 of an organization may have a dashboard view of the training performance of the trainee and be able to map the business sales funnel (sales funnel information) and/or revenue that this trainee brings to the organization along a timeline. This view allows a return of investment (ROI) evaluation of this chatbot software when the owner of a business tries to scale up the operation by training more people. The administrator, owner, or leader 170 of the organization may access data of the product 10 via communication/network channel 182 in some embodiments. Also, in some embodiments, the administrator, owner, or leader 170 of the organization may also create one or more of the skills modules 154, 155, 156.

As shown in the figure, the product 10 also includes a payment module 152 configured to manage payment operations. By means of non-limiting examples, the payment module 152 may be configured to generate invoices for trainees, send invoices to the trainees, receive payments from the trainees, manage and process the payments from the trainees, and update accounting and payment records based on the payments from the trainees. In some embodiments, the payment module 152 may be configured for a bulk subscription where the owner/broker subscribes for all his/her agents for training. In such cases, the payment module 152 is configured to receive payment by the owner/broker, and the individual trainees within the broker's organization does not need to pay extra for the training.

Also, as shown in the figure, the product 10 includes a scheduler 153 configured to set training schedules for the trainees. In some embodiments, the training schedules may be prescribed by trainers 160a, 160b. In other embodiments, the training schedules may be set by the trainees.

Furthermore, in some embodiments, a skills module (e.g., any of the skills modules 154, 155, 156) may be a chatbot itself. In some cases, if there are multiple skills modules that are respective chatbots, then the chatbots collectively form a super-chatbot (in which cases, item 150 is the super-chatbot). In further embodiments, instead of having multiple skill modules shown in FIG. 1, the product 10 may include only one skill module as the chatbot 150.

In the illustrated embodiments, items 184a-184i represent different communication paths/connections/signal transmissions between different modules of the product 10.

In some embodiments, it may be desirable for the product 10 to provide a tool for enabling an easy onboarding for a trainer 160a-160b to create his or her own skills module.

Figure 2:
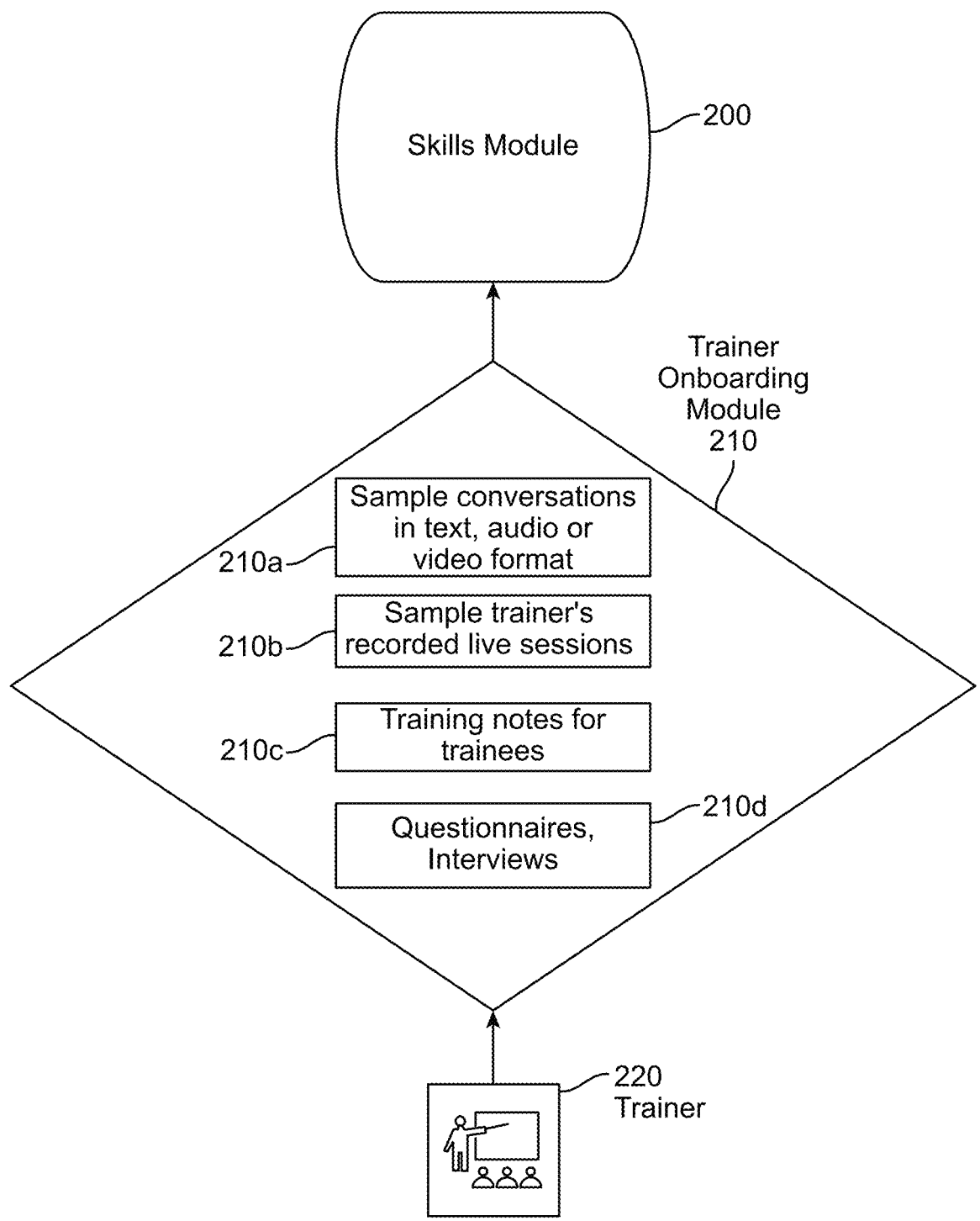
FIG. 2 shows a Trainer Onboarding Module through which a trainer can set up his or her skills module based on recorded or authored sample communication, and/or based on information derived from questionnaires and/or interviews.

FIG. 2 illustrates an example of an onboarding module 210 for allowing one or more trainers to create one or more skills modules. It is common that a trainer 220, although an expert in his or her subject matter, may not be technically savvy. For example, the real-estate agent trainer may not know how to trouble-shoot a computer or may not be able to understand the many formats of a video file. Hence it may be beneficial to provide the trainer with the onboarding module 210 to create one or more skills modules (e.g., skills module 200), and/or to update the skills module(s). As shown in the figure, the onboarding module 210 may have a conversation upload module configured to allow the trainer 220 to upload sample training conversations 210a in text, audio, video, sensor data, or any combination of the foregoing. The onboarding module 210 may also have a module that allows the trainer to upload his or her own recorded or authored conversations 210b, training notes and trainee assignments 210c in various file formats for trainees. The onboard module 210 may also have an input module configured to obtain key elements of a conversational subject area, and to create, update, and/or update a skills module based on the key elements. As shown in the example, the onboard module 210 may be configured to obtain the key elements by providing a questionnaire to the trainer or to interview the trainer (item 210d), and to extract the key elements of the conversational subject area based on the input from the trainer. In other examples, the onboard module 210 may be configured to obtain the key elements by providing a user interface that allows the trainer to input the key elements of the conversational subject area. The user interface may include text field, drop-down menu, check boxes, etc., for allowing the trainer to input information regarding the key elements of the conversational subject area.

Figure 3:
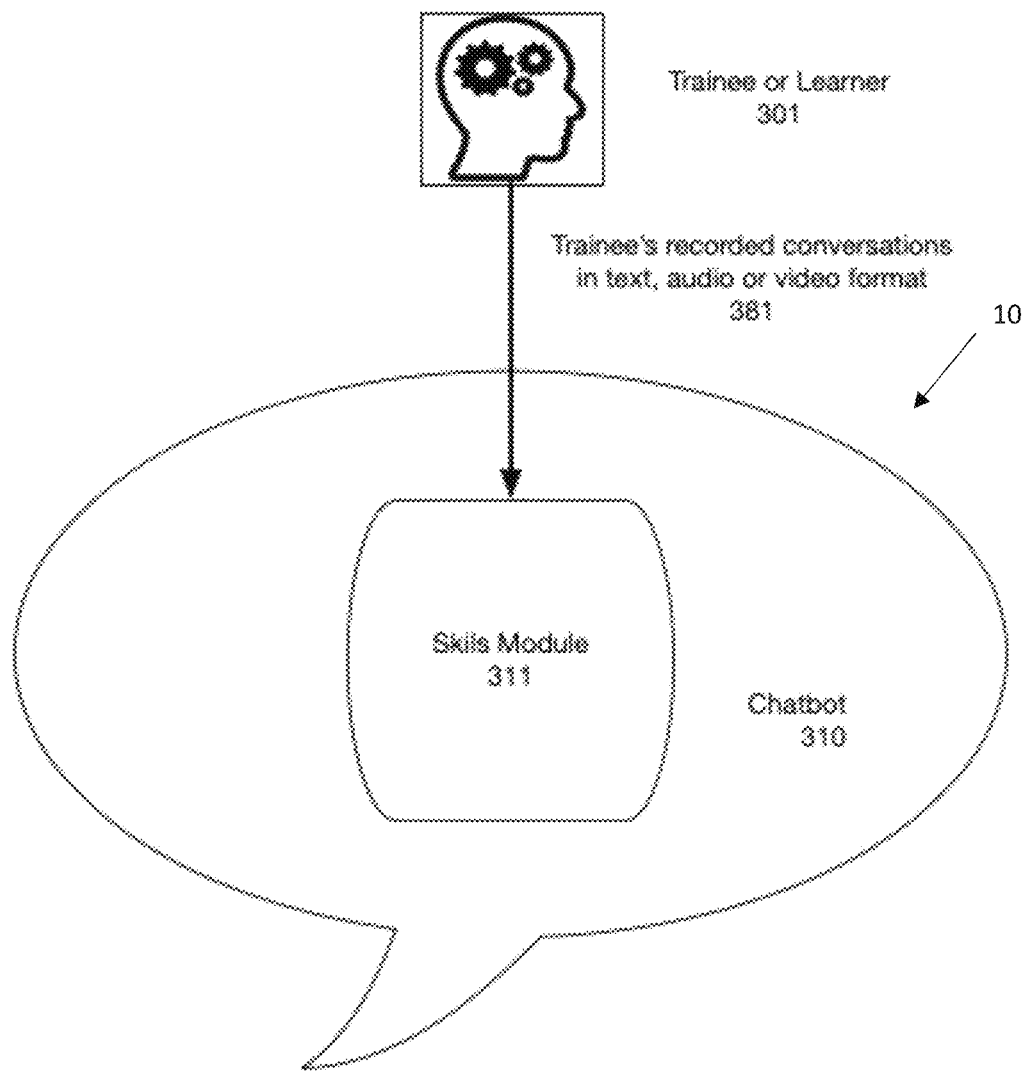
FIG. 3 shows a trainee uploading his or her recorded communication to a skills module for evaluation, and/or for setting up a training session, and/or for enhancing a training session.

Also, in some embodiment, the product 10 may be configured to allow the trainee to upload information to a skills module such that it can enhance the training of the skills module. As shown in FIG. 3, the skills module 311 allows the trainee 301 to upload his or her own recorded conversations 381 with another human being, such as a client, wherein a recorded conversation may be text, audio, video, or any combination of the foregoing. The skills module 311 may also allow the trainee 301 to upload training materials in various formats from other relevant sources, such as YouTube video clips, or any of other contents, from the public domain. The uploaded information may be used to configure the skills module 311 to setup training session, to enhance a training session, and/or to allow evaluation of the recorded conversations. The trainee 301 may use the chatbot 310 as a role-play conversation practice platform without having a trainer or coach. In some embodiments, the skills module 311 may be configured to play back one or more recorded conversations through the chatbot 310. Also, in some embodiments, the chatbot 310 may be configured to add new utterances for each given intent, and enables role-play training in various roles with the trainee without involving a live trainer. In some embodiments, the trainee 301 may also upload completed training assignments to the skills module 311. The skills module 311 may be configured to allow the trainee's trainer to view the completed training assignments. The skills module 311 may also allow the trainee 301 to set up personal progress goals such as the number of cold calls, appointments and closing ratios per month. In some embodiments, the chatbot 310 may be configured to remind the trainee 301 on his/her progress, and recommend training session(s) to fill in any gap(s) in performance.

Figure 4:
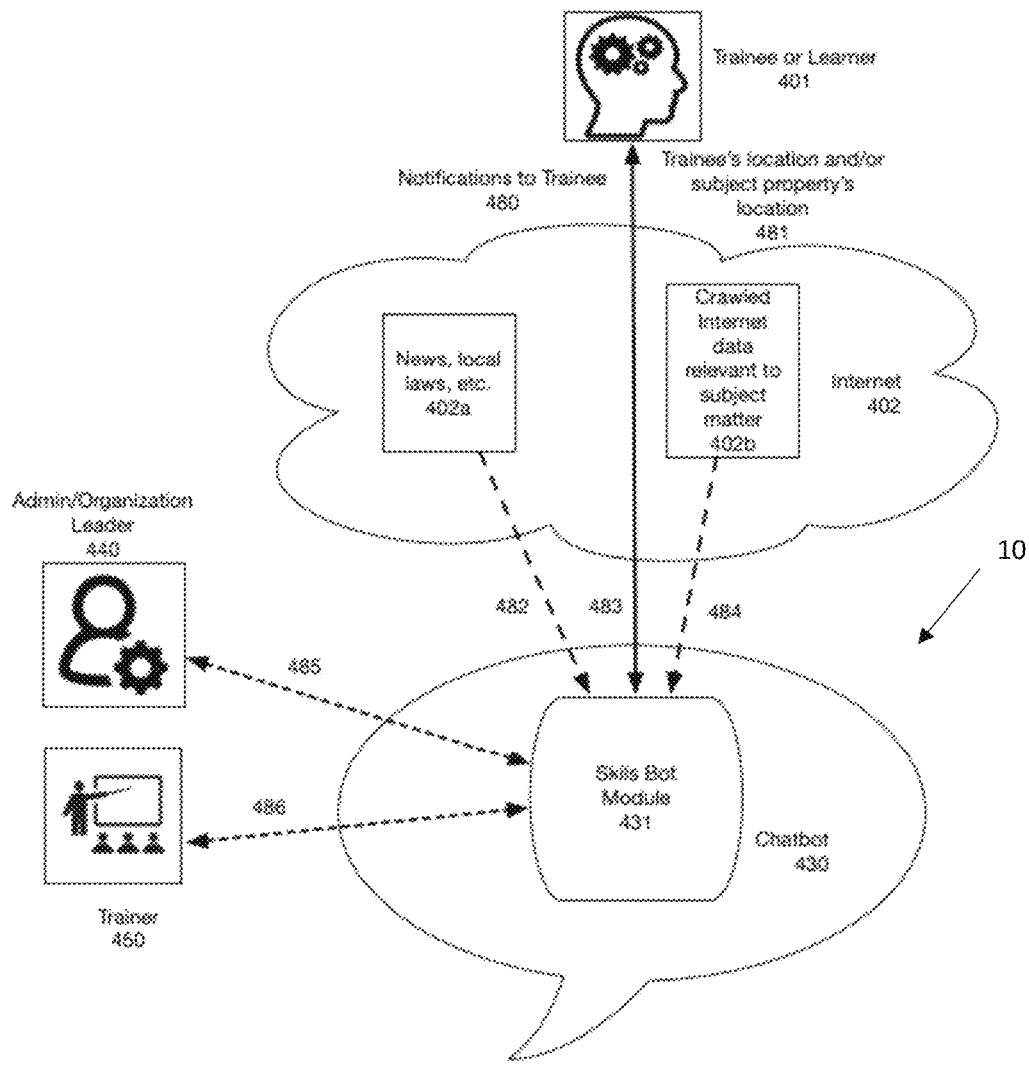
FIG. 4 shows the training contents of a skills module may be updated, including in real-time, based on the news and local environment around the geographic location of the trainee, such as the trainee's GPS coordinates, or in the case of real-estate, the subject property's location.

In some embodiments, any of the skills modules described herein may be configured to present up-to-date information to a trainee, and/or may be configured to be updated based on up-to-date information. FIG. 4 shows an example of a chatbot 430 having a skills module 431. The chatbot 430 may be any of the chatbots (such as any of the ones described in FIG. 1) described herein. The skills module 431 is configured to present up-to-date information to the trainee 401, and/or is configured to be updated based on the up-to-date information. In some embodiments, the skills module 431 is configured to obtain a location (e.g., a GPS coordinates) of the trainee 401, and crawl through the Internet for news, local laws, or any local environment related information 402a based on the location of the trainee 401. In the case of a real-estate agent training, the skills module 431 may be configured to obtain a subject property's location, and may crawl through the Internet for news, local laws, or any local environment related information 402a based on the subject property's location. Alternatively or additionally, for a given subject matter, the skills module 431 may crawl through the Internet and search for relevant information 402b (such as articles, hyperlinks, audio tracks, video links, videos, etc.) that are relevant to the subject matter. The skills module 431 may process (e.g., extract, organize, compile, sort out, etc.) such information into an easy-to-understand manner for presentation to the trainee. Hence the trainee 401 will get the most up-to-date information about a subject matter when communicating with the chatbot 430. In some embodiments, the skills module 431 may also be configured to be updated based on the information obtained from the Internet. In one implementation, certain rules may be set up at the skills module 431 such that if the crawled information from the Internet meets one or more criteria of such rules, an approval process may be triggered before the information is presented to the trainee 401. The approval process may involve the administrator or organization leader 440, and/or the trainer 450 performing certain task to approve the information for updating the skills module 431 and/or for presenting the information to the trainee 401. Alternatively, the information may be presented to the trainee 401 automatically and/or may be utilized to update the skills module 431 automatically without requiring an approval process to be performed by an administrator. As shown in the figure, in some cases, news and relevant information may be pushed to the trainee 401 via notifications 480 without having the trainee logging in for a training session.

In some embodiments, a chatbot (e.g., any of the chatbots described herein) may gain enough examples from the trainers and trainees, and through machine learning utilizing such examples, the chatbot may become an independent virtualized agent. For example, the chatbot may gain enough knowledge that it can initiate real estate solicitation calls to potential clients in some embodiments.

Figure 5:
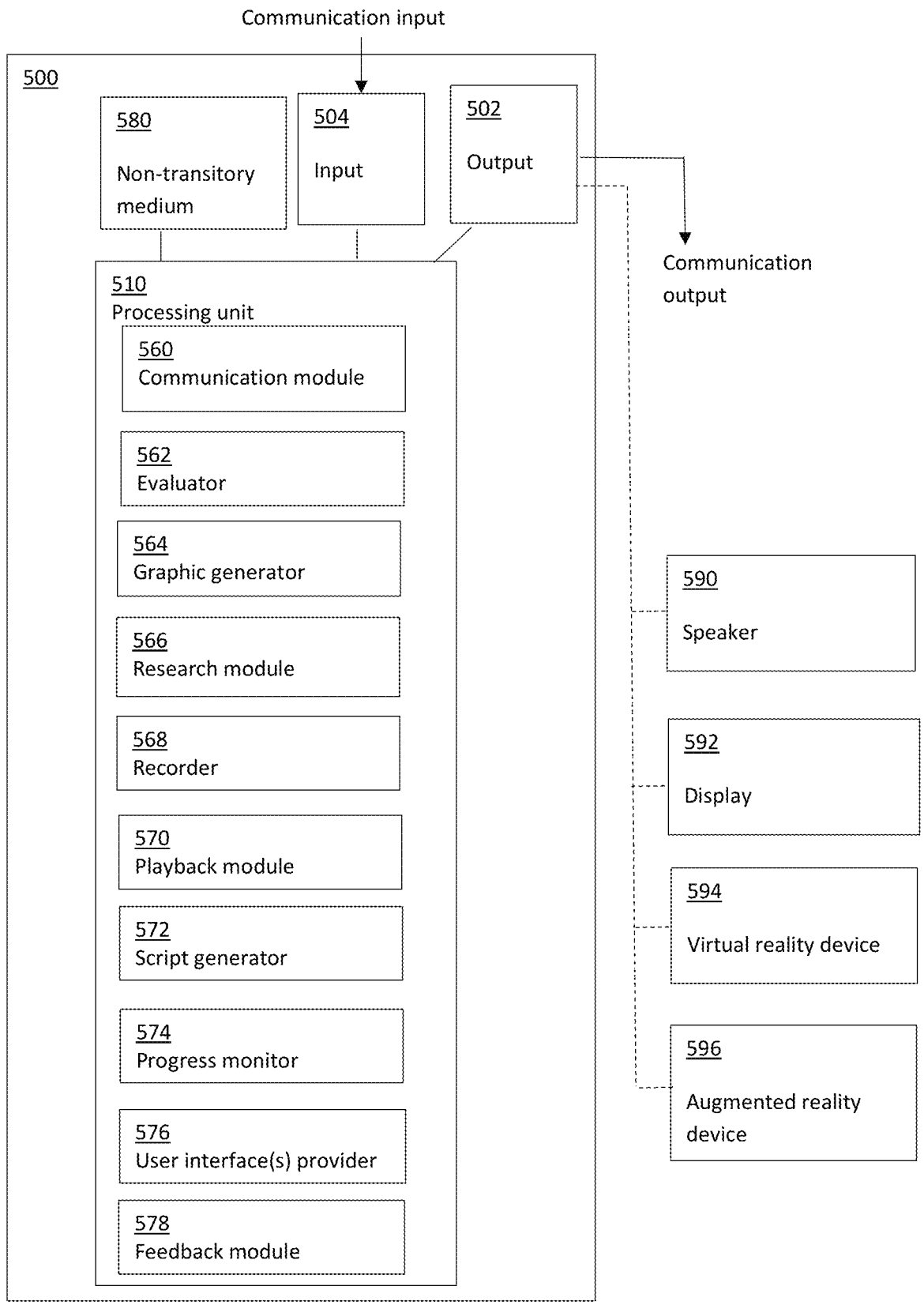
FIG. 5 illustrates an example of the product of FIG. 1.

FIG. 5 illustrates an example of a product 500 for training a user to communicate in a subject area. In some embodiments, the product 500 may be, or may comprise, a Communicational Artificial Intelligence™ (CAI) system. A CAI system may have artificial intelligence in one or more areas related to communication. For example, a CAI system may have artificial intelligence for processing data associated with speech, facial expression, gesture. In some embodiments, a CAI system may include a conversational AI for handling speech, a facial expression AI for handling facial expression involved in a communication, a gesture AI for handling gestures performed during a communication, etc., or any combination of the foregoing. In some embodiments, the product 500 may be a chatbot or may be a system configured to provide a chatbot. In other embodiments, the product 500 may be an Internet-of-Things (IoT) device, a robot, a toy, or an elderly-assist device. The product 500 may be implemented in one or more servers, one or more computing systems, one or more electronic devices (such as a hand-held device), or any combination of the foregoing.

In some embodiments, the product 500 may be an example of the product 10 of FIG. 1, or may be an example of a component of the product of FIG. 1. For example, in some embodiments, the product 500 may be the 150 chatbot, or may be one or more of the skills modules 154, 155, 156 in the product 10 of FIG. 1.

Refer to FIG. 5, the product 500 includes: an output 502 configured to provide a first communication output for presentation to the user during a training session; an input 504 configured to obtain a communication input representing or indicating a communication action performed by the user in response to the first communication output during the training session; and a processing unit 510. The processing unit 510 includes a communication module 560 configured to process the communication input to determine a second communication output for presentation to the user during the training session. The product 500 also includes an evaluator 562 configured to evaluate a communicational performance of the user.

The output 502 may be a software and/or hardware interface configured to output data from the processing unit 510. In some embodiments, the output 502 may be a part of the processing unit 510. Similarly, the input 504 may be a software and/or hardware interface configured to input data to the processing unit 510. In some embodiments, the input 504 may be a part of the processing unit 510. In some embodiments, the output 502 may include one or more output components (e.g., output interface(s)). Also, in some embodiments, the input 504 may include one or more input components (e.g., input interface(s)). Furthermore, in some embodiments, the output 502 and the input 504 may be combined into a component.

In the illustrated embodiments, the product 500 is configured to role-play with the user without a presence of a human trainer. In some embodiments, the processing unit 510 is configured to obtain communication input provisioned by the user's communication action, and determine an intent of the user based on communication input provisioned by the user's communication action. Also, in some embodiments, the processing unit 510 is configured to determine a communication output for responding to the user based on the determined intent of the user. In addition, in some embodiments, the processing unit 510 may be configured to determine the communication output for responding to the user also based on a level of difficulty at which the user is being trained.

The processing unit 510 may be implemented using hardware, software, or a combination of both. In some embodiments, the processing unit 510 may include one or more processors (e.g., signal processor(s), FPGA processor(s), ASIC processor(s), general purpose processor(s), etc.). The one or more processors may implement one or more modules that are configured to perform certain specific functions for the processing unit 510. The one or more processors may be connected to each other physically, or may be in communication with each other wirelessly or through the Internet. Thus, components of the processing unit 510 may be located in different locations. In other embodiments, the processing unit 510 may be any integrated circuit having at least some hardware. In further embodiments, the processing unit 510 may include one or more software or application modules. The one or more software or application modules may be run on one or more electronic devices, such as one or more computers (which may be communicatively coupled by cables and/or wirelessly), one or more servers (which may be communicatively coupled by cables and/or wirelessly), etc.

In some embodiments, the communication action performed by the user may comprise a speaking action, and the communication input obtained via the input 504 of the product 500 may comprise an audio signal representing speech associated with the speaking action. In such cases, the processing unit 510 may include a speech-to-text module configured to convert speech signals into text. The text may then be processed by the communication module 560. In some cases, the communication module 560 may include the speech-to-text module. In some embodiments, the communication module 560 may comprise a speech generator configured to generate speech signals based on the second communication output obtained via the input 504 of the product 500. In other embodiments, the communication action comprises a speaking action, and the communication input obtained via the input 504 may comprise text derived from speech associated with the speaking action. In further embodiments, the communication action comprises a making of a gesture by the user, and the communication input obtained via the input 504 of the product 500 may comprise an image or a classification indicating the gesture.

In some embodiments, the processing unit 510 includes a speech detector configured to detect speech in the communication input received by the input 504. For example, the communication input may include audio data, and the speech detector may be configured to process such audio data to determine speech information. Alternatively or additionally, the processing unit 510 may include a gesture module configured to detect gesture based on the communication input received by the input 504. In one implementation, the gesture module may be a machine perception and Perceptual User Interface (PUI) module. Alternatively or additionally, the processing unit 510 may include an expression module configured to determine a facial expression based on the communication input received by the input 504. For example, the communication input may include video or image data, and the expression module may be configured to process such data to determine a facial expression of the user. In some embodiments, the speech detector, the gesture module, the expression module, or any combination of the foregoing, may be implemented outside the communication module 560. In such cases, the speech detector, the gesture module, the expression module, or any combination of the foregoing, may have output coupled to one or more inputs of the communication module 560. In other embodiments, the speech detector, the gesture module, the expression module, or any combination of the foregoing, may be implemented in the communication module 560.

In some embodiments, the communication module 560 comprises a neural network model. The neural network model may be trained by machine learning based on a data set having a set of words associated with a communicational intent. The neural network model may be implemented via any types of neural networks (e.g., convolutional neural networks, deep neural networks). In some embodiments, the data output of the neural network model may be a numerical vector (e.g., a low dimensional numerical vector, such as embedding). The numerical vector may not be interpretable by a human, but may provide information regarding detected intent(s), detected meta data of intent(s), detected tone(s), and story/stories. In other embodiments, the data output of the neural network model may be any information indicating, representing, or associated with communicational intent, meta data of intent, tone, story, etc.

In some embodiments, the neural network model itself is a machine learning model. Also, in some embodiments, the communication module 560 may include the neural network model (an example of machine learning model) and another machine learning model. Thus, in come embodiments, the communication module 560 may include one or more machine learning models. If the communication module 560 includes multiple machine learning models, the machine learning models may be configured to process different respective types of data. For example, the communication module 560 may have a first machine learning model configured to process audio data (e.g., to determine intent from speech), and a second machine learning model configured to process video data (e.g., to determine facial expression, gesture, etc.). Any of the machine learning models may or may not be a neural network model. In some embodiments, the machine learning models of the communication module 560 may be respective neural network models. In such cases, the communication module 560 may have multiple neural network models.

Also, in some embodiments, the neural network model and/or another machine learning model may be configured to provide multiple metrics indicating respective probabilities of different intents based on the communication input. In such cases, the processing unit 510 (e.g., the communication module 560) may be configured to select one of the intents with a corresponding metric indicating the highest probability. In such cases, the processing unit 510 (e.g., the communication module 560) may be configured to determine the second communication output based on selected intent, and using an algorithm that comprises a set of pre-defined and/or data-driven rules associating different intents with pre-defined and/or data-driven responses.

It should be noted that the processing unit 510 (e.g., the communication module 560) is not limited to having a neural network model and/or other machine learning model to process user's communication, and that the processing unit 510 may utilize any processing technique, algorithm, or processing architecture to determine what to communicate with the user. By means of non-limiting examples, the processing unit 510 (e.g., the communication module 560) may utilize equations, regression, classification, heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, or a combination of two or more of the above, to process user's communication to determine what to communicate with the user (e.g., what response or statement to provide to the user).

In the illustrated embodiments, the product 500 is configured to simulate a person to interact with the user. In one example, the person is a property owner, and the product 500 is configured to simulate the property owner to interact with the user. In such cases, the product 500 is configured to train the user as a real estate agent to interact with the property owner. In another example, the simulated person is a real estate agent, and the product 500 is configured to simulate the real estate agent to interact with the user, and/or to show the user how a model real estate agent responds to one or more situations. In some embodiments, the processing unit 510 may also comprise a graphic generator 564 configured to provide an image simulating an environment of a property. For example, when training a user as a real estate agent, the graphic generator 564 may display an image of a property. The image may be a real 2D or real 3D image of an actual property, or may be a computer-generated image of an environment of a property.

Also, in some embodiments in which the communication module 560 is configured to train a user as a real estate agent, the product 500 may be configurable by a real-estate agent, a real-estate broker, or a real-estate agent trainer. For example, the product 500 may provide a user interface for allowing the real-estate agent, the real-estate broker, or a trainer to provide training data for the communication module 560, to adjust one or more processing parameters of the communication module 560. In some cases, the user interface may allow a real-estate agent, a real-estate broker, or a real-estate agent trainer to enter a new conversational topic for a subject area, to define various possible intents that may occur in the conversational topic, to provide training data sets associated with the defined intents, to define one or more rules for processing intents, entities (meta data about the intents) to determine how the communication module 560 should respond to user's communication (e.g., utterances).

In some embodiments, the product 500 is configured to provide communication training for the user in the subject area of real estate, and such subject area may include one or more topics selected from the group consisting of: pre-qualifying a potential client, listing presentation, objections handling, just-listed solicitation, just-sold solicitation, open-house conversation, for-sale-by-owner conversation, expired-listing conversation, lead generation, business development, and a transaction-related topic.

In other embodiments, the product 500 may be configured to simulate a school teacher, a parent, a counselor, or an individual who is interested in passing some knowledge. In further embodiments, the product is configured to train the user as a student in a grade level that is anywhere from kindergarten to 12th grade. The product 500 may be configured to provide communication training in a subject area that is an academic subject or a non-academic subject. By means of non-limiting examples, the subject area may be business, finance, technology, legal, retail, recruiting, medicine, dating, etc., or any subject area for which training is needed.

In some embodiments, the product 500 may allow the user to switch role with the communication module 560. For example, in a first mode of operation, the product 500 may be configured to simulate a first person in a first role to interact with the user in a second role. In a second mode of operation, the product 500 may be configured to simulate a second person in the second role to interact with the user in the first role. In one implementation, the processing unit 510 may be configured to receive an input from the user (e.g., via a user input device, a user interface, etc.) indicating that the user desires to switch role. In response to such input, the processing unit 510 may then generate a control signal to cause the communication module 560 to interact with the user in the switched role. For example, the user may initially be a trainee as a real-estate agent, and the communication module 560 may be configured as a prospective client to interact with the user. After the processing unit 510 receives an input indicating that the user desires to switch role, the user may then be a trainee as a prospective client, and the communication module 560 may be configured as a real-estate agent to interact with the user.

It should be noted that the product 500 is not limited to simulating only one person to communicate with one user.

In some embodiments, the product 500 is configured to simulate multiple persons in different respective roles to interact with the user during the training session. For example, in a listing presentation, the product 500 may simulate conversations from both the husband and wife at the same time (as prospective clients), and the user (trainee) plays the role of a real estate agent. In other embodiments, the product 500 is configured to simulate a person to interact with the user and another user during the training session. In further embodiments, the product 500 is configured to simulate multiple persons in different respective roles to interact with multiple users during the training session.

In some embodiments, the output 502 of the product 500 is configured to communicate with a user 590, a display 592, a virtual reality device 594, an augmented reality device 596, or any combination of the foregoing. For example, the communication module 560 may generate a communication output for responding to the user. Such communication output may be speech signals that are provided to the user 590 via the output 502. The user 590 then generates audio sounds based on the speech signals. Alternatively, the communication output by the communication module 560 may be text. In such cases, the text may be converted into speech signals by a text-to-speech module, and the speech signals are then provided to the user 590 via the output 502. In other embodiments, the communication output by the communication module 560 may be video data. In such cases, the video data is provided to the display 592 via the output 502. The display 592 then generates video based on the video data. In further embodiments the communication output by the communication module 560 may be graphical data. In such cases, the graphical data is provided to the display 592, to the virtual reality device 594, or to the augmented reality device 596, via the output 502. The display 592, virtual reality device 594, or the augmented reality device 596 then generates graphics based on the video data.

In other embodiments, the speaker 590 and/or the display 592 may be a part of the product 500. Thus, in some embodiments, the product 500 may include the speaker 590 and/or the display 592. Also, in some embodiments, the product 500 may include the virtual reality device 594, or may be a part of the virtual reality device 594. In further embodiments, the product 500 may include the augmented reality device 596, or may be a part of the augmented reality device 596.

In some embodiments, the evaluator 562 is configured to determine a performance metric indicating the communicational performance of the user. In one implementation, the evaluator 562 may be configured to determine the performance metric based on a degree of coverage of topics in the subject area. For example, if the subject area has three possible topics, and if the evaluator 562 has determined that the user has covered two topics during a training session conducted with the product 500, then the evaluator 562 may determine a coverage score that is ⅔=67% in the above example. In other embodiments, the evaluator 562 may be configured to determine the coverage score based on other formulas involving the number of possible topics, and the number of topics covered by the user.

In some embodiments, the evaluator 562 may be configured to determine the metric based on whether a state of a communication between the user and the product satisfies a pre-defined or data-driven criterion. In one implementation, the communication may be regarding a subject matter having one or more topics, and there may be one or more respective pre-defined or data-driven criteria for the one or more topics. A topic may have one or more pre-defined and/or data-driven communication outcomes. In some embodiments, the evaluator 562 may be configured to determine the metric based on whether a communication between the user and the product 500 has reached one or more pre-defined and/or data-driven outcomes. In some cases, different respective values of the metric may be assigned for the different respective outcomes of a communication (e.g., conversation) between the user and the communication module 560 during a training session. In some embodiments, there may be two metric values assigned for two different respective outcomes of a discussion in a topic. For example, if the conversation topic between the user and the communication module 560 is securing listing appointment with a prospective property seller, and if the conversation has reached a state in which the communication module 560 simulating the prospective property seller has agreed to a listing appointment with the user, then the evaluator 562 may determine that the metric (e.g., score) for that particular conversation topic is 100. On the other hand, if the conversation between the user and the communication module 560 does not reach the state in which the communication module 560 simulating the prospective property seller has agreed to a listing appointment, then the evaluator 562 may determine that the metric (e.g., score) for that particular conversation topic is 0.

It should be noted that for a particular conversation topic, there may be more than two possible outcomes. For example, there may be three pre-defined outcomes for a conversation topic: not successful, semi-successful, and successful. Following the above example (regarding the conversation topic being securing listing appointment with a prospective property seller), the conversation between the user and the communication module 560 may reach a state in which the communication module 560 simulating the prospective property seller decides to give it some thought, then the evaluator 562 may determine that the metric (e.g., score) for that particular conversation topic is 50. In one implementation of this example, the communication module 560 may have the below three pre-defined possible responses for presentation to the user, and the corresponding three pre-defined evaluation scores:

(1) "Sure, I'll give you the listing appointment"; Score=100
(2) "Let me think about it, and I'll let you know"; Score=50
(3) "No, I'm not interested"; Score=0

During a training session, the communication module 560 interacts with the user and the communication may reach the topic of securing listing appointment. Within this conversation topic, there may be multiple pre-defined and/or data-driven conversation sub-topics, and multiple pre-defined and/or data-driven conversation layers for the topic or sub-topics. Based on the intent determined by the communication module 560 (e.g., a machine learning model, such as a neural network model, therein), the communication module 560 may select (e.g., based on an algorithm) one of the sub-topics, and/or may select one of the conversation layers. In some embodiments, each of the above three pre-defined possible responses (1)-(3) with the respective three scores may be the outcomes assigned for a sub-topic or a conversation layer. If the conversation has reached a state in which the communication module 560 provides one of the above three responses, the communication module 560 may then determine that the conversation for that particular topic has concluded, and the evaluator 562 may determine the score for that topic as that score that was assigned for the response provided by the communication module 560.

In other embodiments, there may be more than three, or fewer than three, pre-defined outcomes for a communication topic.

It should be noted that other techniques for scoring may be employed by the product 500. In other embodiments, the evaluation module 562 is configured to maintain a checklist of topics to cover in a communication training session. During the training session, the evaluation module 562 determines whether a user has completed certain topic(s), and if so, the evaluation module 562 then checks off the items in the checklist. After the training session, the evaluation module 562 may determine an evaluation score based on how many topics in the checklist the user has completed. For example, if the user completed 6 out of 10 topics in the checklist, then the evaluation module 562 may determine the score as 60% in the example.

Also, in some embodiments, a topic or sub-topic may include multiple communication (e.g., conversation) layers. Each communication layer represents a single exchange between the user and the communication module 560. A user who has communicated in-depth for a particular topic or sub-topic will have traversed many communication layers. On the other hand, a user who has barely scratched on a surface of a topic or sub-topic will have traversed only one or a few communication layers. In some embodiments, the evaluation module 562 is configured to determine how many communication layers a user has traversed for a particular topic or sub-topic. The more communication layers the user has traversed, the higher the score will be determined by the evaluation module 562 for the user.

In further embodiments, the evaluator 562 may take into account other parameters when evaluating a performance of a trainee. For example, in other embodiments, instead of, or in addition to, tracking outcome of a communication topic, the evaluator 562 may determine a trainee's tonality, gestures, etc., and determine a score based on one or more of these parameters. In some cases, if the trainee exhibited calm and confident tonality along with good gestures indicating good rapport, then the evaluator 562 may provide higher score for such trainee. In some embodiments, the product 500 may include a speech analyzer to determine tonality, and may also include pose identifier to determine one or more gestures of a trainee.

Also, in some embodiments, the evaluator 562 may evaluate a performance of a trainee based on a final outcome of a communication topic, and/or a number of attempts for the trainee to reach the final outcome. For example, a sales (agent) may use a plurality of "closing" techniques/scripts after a client (e.g. seller) has said "no" to the agent. Thus, even if the trainee (user) initially did not get the desired outcome from the person simulated by the product 500, but if the user eventually obtains the desired outcome after a number of tries (e.g., 3 attempts), the evaluator 562 may provide a good score for the user. This awards users who do not give up easily and are persistent with achieving a desirable outcome. In a real-world application, a property seller may reject an agent a number of times during one call, but the seller may finally agree to have "preview appointment" with the agent after the agent performs different "closing" techniques. Thus, the scoring system employed by the evaluator 562 may reflect such real-world situations in some embodiments.

In some embodiments in which the facial expression and/or gesture of the user is being monitored by the product 500, the evaluator 562 may generate a performance score based on the detected facial expression(s) and/or gesture(s). For example, in some embodiments, the evaluator 562 may compare the detected facial expression of a user with a model facial expression during a particular period of the communication training session. If the detected facial expression matches the model facial expression, then the evaluator 562 may provide a higher score for the user. On the other hand, if the detected facial expression does not match the model facial expression, then the evaluator 562 may provide a lower score for the user. The comparing of the detected facial expression of the user with the model facial expression may involve comparing an image of the user with the facial expression with an image of the modeled facial expression. Alternatively, the comparing of the detected facial expression of the user with the model facial expression may involve comparing a facial expression classification with a model facial expression classification. In such cases, the evaluator 562 may process an image of the user to determine a classification of the facial expression. For example, after processing the image, the evaluator 562 may determine that the user was "smiling". In such cases, the evaluator 562 may compare this with the model classification of facial expression (which is the facial expression expected at the particular time point of the communication training). If the model classification of facial expression is also "smiling", then the evaluator 562 may provide a higher score for the user. On the other hand, if the model classification of facial expression is "serious", then the evaluator 562 may provide a lower score for the user. In other embodiments, there may not be any model facial expression. Instead, there may be undesirable facial expressions that are used for evaluating a detected expression of the user. For example, at a certain time point of a communication training, after the communication module 560 provides a statement, there may be no model expression (e.g., the user is not expected to exhibit any particular desirable facial expression). Instead, there may be one or more undesirable facial expressions (e.g., the user should not be laughing or smiling, or giggling). In such cases, if the user's expression matches an undesirable facial expression, then the evaluator 562 may provide a lower score for the user.

Similarly, in some embodiments, the evaluator 562 may compare a detected gesture of a user with a model gesture during a particular period of the communication training session. If the detected gesture matches the model gesture, then the evaluator 562 may provide a higher score for the user. On the other hand, if the detected gesture does not match the model gesture, then the evaluator 562 may provide a lower score for the user. The comparing of the detected gesture of the user with the model gesture may involve comparing an image of the user with the gesture with an image of the modeled gesture. Alternatively, the comparing of the detected gesture of the user with the model gesture may involve comparing a gesture classification with a model gesture classification. In such cases, the evaluator 562 may process an image of the user to determine a classification of the gesture. For example, after processing the image, the evaluator 562 may determine that the user has an "open arms". In such cases, the evaluator 562 may compare this with the model classification of gesture (which is the gesture expected at the particular time point of the communication training). If the model classification of gesture is also "open arms", then the evaluator 562 may provide a higher score for the user. On the other hand, if the model classification of gesture is "open arms", and the detected user's gesture is "folded arms", then the evaluator 562 may provide a lower score for the user. In other embodiments, there may not be any model gesture. Instead, there may be undesirable gestures that are used for evaluating a detected gesture of the user. For example, at a certain time point of a communication training, after the communication module 560 provides a statement, there may be no model gesture (e.g., the user is not expected to exhibit any particular gesture). Instead, there may be one or more undesirable gestures (e.g., the user should not be folding his/her arms, putting the arms in pockets, etc.). In such cases, if the user's gesture matches an undesirable gesture, then the evaluator 562 may provide a lower score for the user.

In some embodiments, administrators or leaders of the trainees' organization 170 may obtain the performance information provided by the evaluator 562, and may correlate the performance of the trainees in the chatbot's training sessions against the business or academic performance of the trainee. In some embodiments, the communication module 560 (e.g., chatbot) can also be used to test the trainee for skills and competence against a company's or an organization's standard, and the evaluator 562 may provide performance information for such test. Based on the performance information provided by the evaluator 562, a manager may conduct performance evaluation and/or even making an employment or engagement decision. Furthermore, a business owner or manager can use the performance information provided by the evaluator 562 for daily, weekly and/or monthly activity tracking for trainees, and can create monthly, quarterly, and annual business plan and revenue projections.

In some embodiments, the processing unit 510 may optionally also comprise a research module 566 configured to search the Internet, and assemble relevant training information for training the user in the subject area. In some embodiments, the search module 566 is configured to search the Internet based on the communication input representing or indicating the communication action performed by the user. For example, if the user says "I have 12 years old son" during a communication training session, then the research module 566 may search the Internet for schools, school rating, school info for the schools, etc., for certain geographic location. This may occur while the user is conversing with the communication module 560 (e.g., chatbot).

Also, in some embodiments, the research module 566 is configured to search the Internet for information based on a locality related to the user. The locality related to the user may be a location of the user (e.g., a GPS coordinate), or a location associated with a topic being communicated (e.g., conversed) between the user and the communication module 560. For example, if the user says "I have a 12 years old son" during a communication training session, then the research module 566 may search the Internet for middle schools, school rating, school info for the middle schools, etc., for certain geographic location, etc. This may occur while the user is conversing with the communication module 560 (e.g., chatbot). Therefore, the communication module 560 may utilize the researched information to determine what information to present to the user during the conversation with the user.

In some embodiments, the processing unit 510 is configured to provide learned user information regarding the user to a non-transitory medium (e.g., non-transitory medium 580) for storage. The learned user information is information that is learned from the user during communication (e.g., conversation) with the user. The learned user information collectively forms a profile of the user, which may indicate the history of the user, the personality of the user, the preference of the user, the interest of the user, the social and family members, relationships with the social members and family members, goals of the user, etc. In some embodiments, the processing unit 510 is configured to utilize any of the above information to decide what and/or how to communicate with the user in a communication training session. For example, if the learned user information stored in the profile for the user indicates that the user is retired with walking disability, then the research module 566 may search the Internet for single-level properties, and the communication module 560 may communicate such information to the user during a training session.

The first communication output, the communication input, and the second communication output form an interaction between the user and the product 500, and the processing unit 500 may optionally comprise a recorder 568 configured to record the interaction. In some embodiments, the interaction comprises an audio conversation between the user and the product 500, and the recorder 568 is configured to record the conversation in audio form. In other embodiments, the interaction comprises a text conversation between the user and the product 500, and the recorder 568 is configured to record the conversation in text form. In further embodiments, the interaction comprises a gesture or a body pose performed by the user, and the recorder 568 is configured to record the interaction in video form. In the illustrated embodiments, the recorder 568 is configured to process data of the interaction between the user and the product 500, and provide the processed data to the non-transitory medium 580 for storage. In other embodiments, the recorder 568 itself may be a storage device for storing the data of the interaction. In further embodiments, the recorder 568 may be implemented as a part of the non-transitory medium 580. In some embodiments, the processing unit 510 may optionally comprise a script generator 572 configured to generate a script of the recorded audio conversation. Also, in some embodiments, the processing unit 510 may optionally also comprise a playback module 570 configured to playback the recorded interaction. The playback module 570 may be configured to playback the recorded interaction in audio form, text form, video form, or any combination of the foregoing. In some embodiments, the playback module 570 may be configured to provide a playback user interface that provides a field for presenting text, and/or a display area for displaying images and/or videos. In some embodiments, the playback user interface may also allow the user to adjust one or more parameters that control the display of images and/or the videos. For example, the playback user interface may provide a zoom button, a play button, a stop button, a pause button, a fast-forward button, a fast-back button, a slider bar for changing a temporal position of a viewing of the video, a control to control (e.g., change, volume-control, etc.) background music, etc. Also, in some embodiments in which the playback module 570 provides audio playback, the playback user interface may provide text of the audio (e.g., captioning), one or more controls (e.g., a volume control, fast-forward control, fast-backward control, a slider bar for changing a temporal position of the playing of the audio, etc.) for adjusting a playing of the audio, a control to control (e.g., change, volume-control, etc.) background music, etc.

In some embodiments, the processing unit 510 may also comprise a progress monitor 574 configured to monitor a training progress of the user. Also, in some embodiments, the progress monitor 574 may be configured to correlate the training progress with a business parameter. In some cases, the business parameter may be a revenue contributed by the user. In such cases, the progress monitor 574 of the product 500 is configured to correlate the training progress of the user with the revenue contributed by the user. Alternatively or additionally, the business parameter may be sales funnel information, and the progress monitor 574 of the product 500 is configured to correlate the training progress of the user with the sales funnel information. In some embodiments, the progress monitor 574 may be configured to determine a duration of training completed by the user, and compare the duration with a reference duration to determine whether the user has met a progress objective. For example, if the progress objective is 5 hours of communication training, and if the progress monitor 574 determines that the user has used the communication module 560 to practice communication training for only 3 hours, then the progress monitor 574 may determine that the progress objective has not been met, and/or may determine a progress score=$3/5$=60% representing the training progress for the user. Alternatively or additionally, the progress monitor 574 may determine how many topics the user has completed in the training, and compare the number of completed topics with a reference number of topics to determine whether the user has met a progress objective. For example, if there are 10 communication topics under a certain subject area, and the user has completed training of 4 topics, then the progress monitor 574 may determine that the training has not yet been completed, and/or may determine a progress score=$4/10$=40% representing the training progress for the user.

In some embodiments, administrators or leaders of the trainees' organization 170 may obtain the progress information provided by the progress monitor 574, and may correlate the progress of the trainees in the chatbot's training sessions against the business or academic performance of the trainee. In some cases, based on the progress information provided by the progress monitor 574, a manager may conduct performance evaluation and/or even making an employment or engagement decision. Furthermore, a business owner or manager can use the progress information provided by the progress monitor 574 for daily, weekly and/or monthly activity tracking for trainees, and can create monthly, quarterly, and annual business plan and revenue projections.

As discussed, in some embodiments, the communication module 560 is configured to learn to communicate (e.g., converse) with the user in certain subject area. In some embodiments, the product 500 comprises a user interface(s) provider 576 configured to provide a user interface for allowing an administrator and/or the user to create the communication module 560 and/or to update the communication module 560. For example, in some embodiments, the product 500 may be configured to provide a user interface for allowing an administrator and/or the user to create a communication module by defining a subject area for communication training, to define one or more topics under the subject area, to define one or more intents to be identified for each topic, to define entities (meta data for the intent) to be identified for each intent, and to define stories based on one or more intents and one or more entities. The above defined parameters are stored in the non-transitory medium 580. The user interface may also allow the administrator and/or the user to setup rules prescribing how to communicate with the user based on the intents, the entities, and stories. In some embodiments, the rules may form an algorithm that can be used by the communication module to determine what information to present to the user during a training session. The user interface may also allow the administrator and/or the user to provide training data for training the communication module to identify intents, entities, stories, or any combination of the foregoing. In some embodiments, the communication module 560 may identify intent and entities from communication with the user, and may determine a story based on the identified intent and identified entities. The determination of the story by the communication module 560 may be performed using a machine learning model (e.g., a neural network model), and/or an algorithm that comprises rules associating intents and entities with pre-defined and/or data-driven stories.

In some embodiments, the communication module 560 may be considered to have been created after the administrator and/or the user has defined the subject area for which to provide communication training. In other embodiments, the communication module 560 may be considered to have been created after the administrator and/or the user has defined the subject area and the topics under the subject area. In further embodiments, the communication module 560 may be considered to have been created after the administrator and/or the user has defined the subject area, the topics under the subject area, and the intents associated with the topics under the subject area. In still further embodiments, the communication module 560 may be considered to have been created after the administrator and/or the user has defined the subject area, the topics under the subject area, the intents associated with the topics under the subject area, and one or more rules that prescribes what information to present to a user based on identified intents, entities, and/or stories. In still further embodiments, the communication module 560 may be considered to have been created after the administrator and/or the user has defined the subject area, the topics under the subject area, the intents associated with the topics under the subject area, and one or more rules that prescribes what information to present to a user based on identified intents, entities, and/or stories, and have provided at least some training data for training the communication module.

As shown in FIG. 5, the product 500 may also include a feedback module 578. The feedback module 578 is configured to provide feedback information indicating a communication area that needs improvement, and/or a suggestion regarding a next communication training session. In some embodiments, the feedback module 578 is configured to provide the feedback information based on an evaluation result provided by the evaluator 562. For example, the evaluator 562 may determine that a certain topic or sub-topic in the communication subject area needs further practice by the user (trainee). In such cases, the feedback module 578 may provide feedback information to the user based on such evaluation result. For example, the feedback module 578 may send a message (audio and/or text message) informing the user that the certain topic or sub-topic needs to be worked on further.

Alternatively or additionally, the feedback module 578 may generate a report as feedback information indicating the evaluation result for viewing by the user and/or by a human trainer. The report may be stored in a database, and may be accessible by the user and/or the trainer after logging in. In some cases, the report may provide specific details regarding the area(s) that need to be worked on by the trainee. For example, the report may indicate that when the simulated person says "XYZ", the trainee's response of "ABC" is not effective, and may provide one or more model responses for studying by the trainee. The report may also indicate that the trainee's facial expression and/or gesture at certain time point during the training session is not satisfactory, and may provide recommendation(s) on how to improve in these areas. In some embodiments, the report may also provide a video and/or audio of the recorded communication between the user and the product 500. The video and/or the audio may include a time-bar with one or more markers identifying event(s) of interest that is relevant for the evaluation. For example, there may be a marker (e.g., a graphic, such as an object, a flag, etc.) at time=2:34 minute of the time bar. When the user select the marker, the report may provide additional details about the event. For example, the report may indicate that at time=2:34, the user exhibited an unfriendly gesture, responded inappropriately, had an unwelcome facial expression, etc.

In addition, in some embodiments, the feedback module 578 may be configured to determine and provide a recommendation for an action (e.g., next best action) for the trainee and/or the trainer. In further embodiments, the feedback module 578 May 8, 2022 recommend that the user schedules a live coach session, and/or may assist the user in making such scheduling.

As shown in FIG. 5, the product 500 includes the non-transitory medium 580 configured to store data relating to operation of the processing unit 510. In some embodiments, the non-transitory medium 580 may be configured to store one or more models, which the processing unit 510 (e.g., the communication module 560) can access and utilize to identify one or more communication parameters (such as intent, entity, tone, story, expression, gesture, etc.), and/or to determine what and/or how to communicate to the user in a training session based on the one or more communication parameters and based on communication input provisioned by communication action of the user. In some embodiments, a model may be a machine learning model (e.g., a neural network model). Also, in some embodiments, the non-transitory medium 580 storing one or more machine learning models may be a part of the communication module 560. In some embodiments, the model may configure the processing unit 510 so that it has the capability to identify the one or more communication parameters, and/or to determine what and/or how to communicate with the user.

In some embodiments, "entities" are specific wordings that have certain relevance to communication. For example, "I am moving to {San Francisco}. Here, "San Francisco" will be the new destination the client is moving to. The non-transitory medium 580 may be configured to store these entities, and the communication module 560 may be trained to look for these entities. In some embodiments, the non-transitory medium 580 may have a data structure configured to store one or more entities in association with one or more intents, and/or in association with one or more topics under a communication subject area.

Alternatively or additionally, the non-transitory medium 580 may also be configured to store communication input received via the input 504. Also, in some embodiments, the non-transitory medium 580 may also be configured to store data generated by the processing unit 510. For example, the non-transitory medium 580 may be configured to store data generated/obtained by the evaluator 562, the research module 566, the recorder 568, the script generator 572, the progress monitor 574, or any combination of the foregoing. In other embodiments, the product 500 may not include the non-transitory medium 580, and may instead be configured to communicate with the non-transitory medium 580.

In some embodiments, some of the data stored in the non-transitory medium 580 may be aged out. For example, a local law stored previously that is no longer valid may be aged out. In such cases, the product 500 may be configured to age out unwanted data based on a satisfaction of a criterion, such as a tracked lapsed period meeting a predetermined aging period, a passing of a new law, a receipt of an input from an administrator requesting deletion of aged data, etc.

It should be noted that the non-transitory medium 580 may be one or more storage units. For example, the storage units may be configured to store data from the different respective modules of the processing unit 510 (e.g., respectively from the evaluator 562, the research module 566, the recorder 568, the script generator 572, and the progress monitor 574). The storage units may be located in the same geographic location, or may be located in different geographic locations (in which cases, the storage units may be communicatively coupled to each other, and/or may be communicatively coupled to one or more modules of the processing unit 510).

In the above embodiments, the product 500 is described as being configured to provide real-estate agent training. In other embodiments, the product 500 may be configure to provide other types of training. By means of non-limiting examples, the product 500 may be configured to provide training in salesforce onboarding, new product introduction to sales and support teams, insurance agent onboarding, crisis management counseling, or any of other professional activities involving critical/sensitive/professional communication. In further embodiments, the product 500 may be configured to provide training in academics, such as in conversational trainings for a grade level that is anywhere from kindergarten to 12th grade. In addition, in still further embodiments, the product 500 may be configured to teach young people skills that may or may not be in a standard school curriculum, such as interpersonal soft skills, perseverance, conflict management (e.g., how to handle bullying), personal finance, etc. The list of the subject areas that the product 500 may be configured to provide training is unlimited, and each subject area may complement the current education system. Also, in other embodiments, the product 500 may be configured to provide training for enhancing video gaming skills.

Figure 8A:
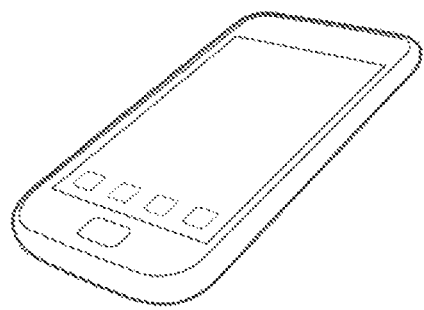
FIGS. 8A-8E illustrate examples of devices in/with which the product of FIG. 5 may be implemented.
Figure 8B:
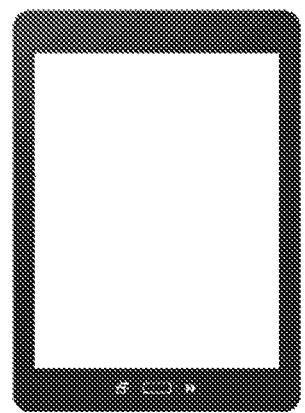
Figure 8C:
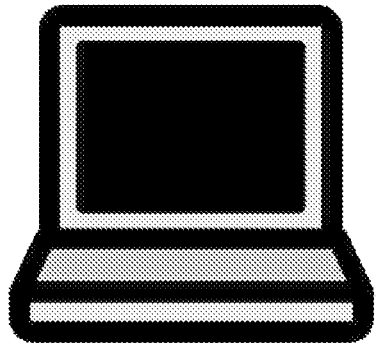
Figure 8D:
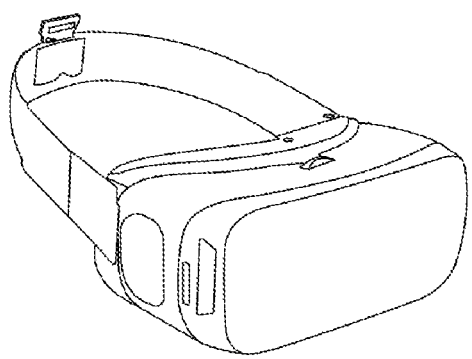
Figure 8E:
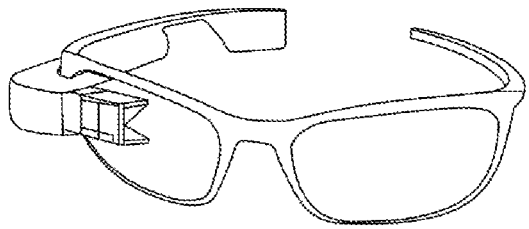

In some of the above embodiments, the product 500 is described as being hosted or implemented in a server. In other embodiments, the product 500, or at least a part of the product 500 (e.g., processing unit 510, the communication module 560, etc.), may be implemented in an electronic device, such as a hand-held device (e.g., a smart phone (FIG. 8A), a tablet (FIG. 8B), a laptop (FIG. 8C), etc.), or a wearable device (e.g., a virtual reality device (FIG. 8D), an augmented reality device (FIG. 8E), etc). In such cases, the product 500 may be any of such electronic devices. Also, in some embodiments, the product 500, or at least a part of the product 500, may be implemented in an Internet-of-Things (IoT) device, a robot, or a toy. Thus, the product 500 may be the IoT device, the robot, or the toy in some embodiments.

Also, in other embodiments, the product 500 may be hosted or integrated into an emotional or medical support devices or special needs support devices, such as for the aging population. Thus, in some cases, the product 500 may be an emotional support device, medical support device, or a special need support device (e.g., elderly assist device). It will be useful for the eldering to learn new skills or hobbies via voice conversation as they may not know how to use a computer or may not be able to see well, or may not have relatives to give them attention. The product 500 may also allow the elderly to pass on their legacy and experiences to their children and grandchildren by creating personalized skill modules that can persist in the digital world.

In some embodiments, the product 500 may be implemented in a device that includes a communication unit configured to connect wirelessly with a network, such as a cloud, the Internet, Bluetooth network, etc., or any combination of the foregoing. In some embodiments, the communication unit may be configured to transmit data involved in the operation of the product 500 (e.g., data generated by the processing unit 510 (e.g., the communication module 560)) to a device, such as a server, a hand-held device, etc. Alternatively or additionally, the communication unit may be configured to receive data involved in the operation of the product 500 (e.g., data generated by the processing unit 510 (e.g., the communication module 560)) from a device, such as a server, a hand-held device, etc. In some embodiments, the communication unit may include one or more antennas. For example, the communication may include a first antenna configured to provide long-range communication, and a second antenna configured to provide near-field communication (such as via Bluetooth). In other embodiments, the communication unit may be configured to transmit and/or receive data physically through a cable or electrical contacts. In such cases, the communication unit may include one or more communication connectors configured to couple with a data transmission device. For example, the communication unit may include a connector configured to couple with a cable, a USB slot configured to receive a USB drive, a memory-card slot configured to receive a memory card, etc.

Figure 6:
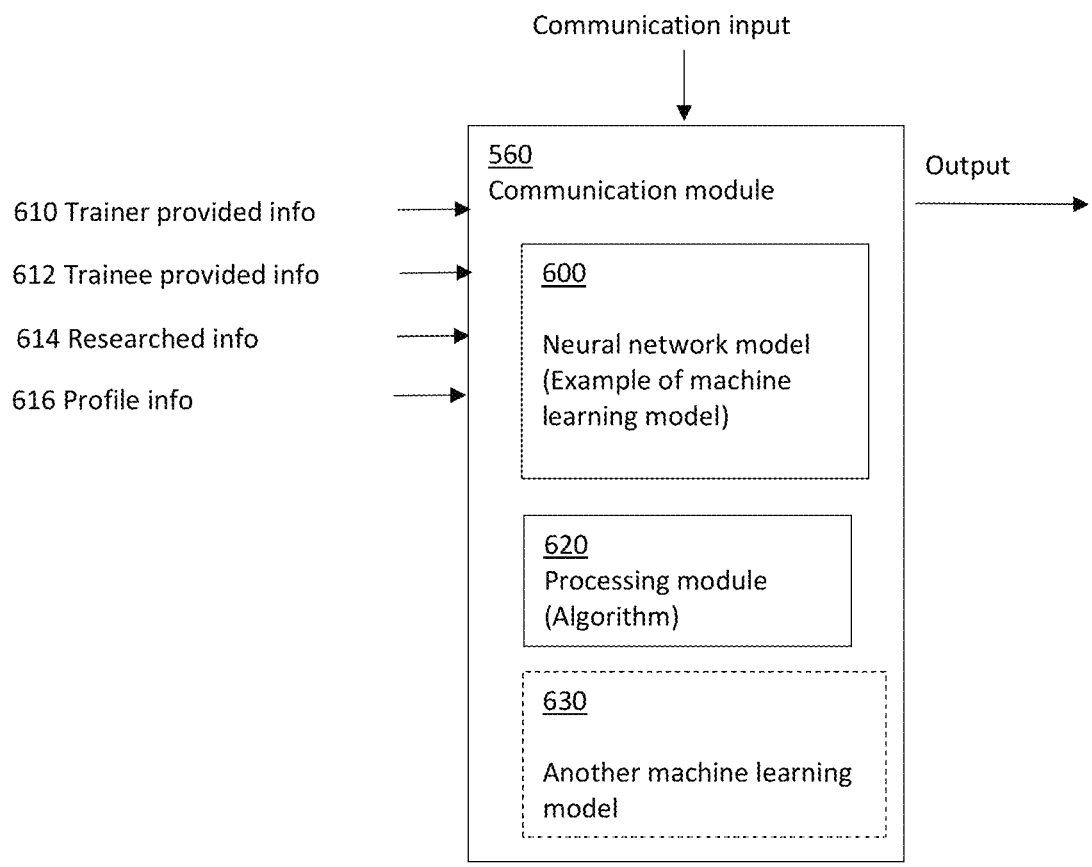
FIG. 6 illustrates an example of a communication module.

As discussed, the communication module 560 is configured to determine what information to present to the user during a communication training session with the user. FIG. 6 illustrates an example of the communication module 560 configured to provide an output based on trainer-provided information 610, trainee provided information 612, researched information 614, profile information 616, or any combination of the foregoing. The trainer-provided information 610 may be any information provided by the trainer to configure the communication module 560, such as any of the information discussed previously with reference to FIG. 2 and FIG. 5. The trainee-provided information 610 may be any information provided by the user (trainee) to configure the communication module 560, such as any of the information discussed previously with reference to FIG. 3 and FIG. 5. The researched information 614 may be any information (e.g., news, statistics, articles, etc.) obtained by the research module 566 regarding a certain subject area, and provided by the research module 566, as discussed. The profile information 616 may be any information regarding different types of simulated persons (e.g., clients). For example, the profile information 616 may include personality profiles of various types of clients (e.g., easy-going clients, tough clients, husband and wife clients who do not agree on the sale of the home, etc.), which may be gathered and fed into the communication module 560. During training session, the communication module 560 interacts with the user by simulating a person that corresponds with the profile information 616. For example, the communication module 560 may simulate an easy going client to provide an easy level of training for the user. In another training, the communication module 560 may simulate a more difficult client to provide a more difficult training for the user.

As shown in FIG. 6, in one implementation, the communication module 560 includes a neural network model 600 in some embodiments. The neural network model 600 is trained by machine learning using data sets provided by the trainer and/or trainee. For example, the data sets may be previously recorded conversations provided by trainer, recorded conversations provided by the user (trainee), text/script of previously recorded conversations provided by trainer and/or trainee, etc. Also, in some embodiments, the data sets may be labeled to identify intents, entities, stories, or any combination of the foregoing that are associated with one or more phrases, sentences, and/or group of sentences in the conversations. Also, in some embodiments, to improve an efficiency of the machine learning, an administrator or trainer may provide a list of words, phrases, and/or sentences that are associated with the same intent. There may be multiple of such lists for different respective defined intents. By providing such lists to train the neural network model 600, the neural network model 600 can quickly learn to identify various intents based on the words, phrases, and/or sentences in the lists.

In some embodiments, deep learning or artificial intelligence may be used to develop the neural network model 600 to identify various conversational parameters, such as intents, tones, entities, stories, or any combination of the foregoing. The neural network model 600 may output probabilities for different respective intents. In such cases, the communication module 560 may be configured to select the intent with the highest probability as the determined or identified intent. For example, if the user says "I love to stay in this neighborhood when I retire", the neural network model 600 may process this utterance, and may determine the below intents and corresponding probabilities:

1. Intent to sell property—15%
2. Intent to keep property— 85%

The communication module 560 may then select intent No. 2 (intent to keep property) because it has the highest probability, and may determine that the user has an intent to keep the property. In some cases, the communication module 560 may not confidently determine an intent. For example, if the probabilities of two intents do not differ by more than a certain amount (e.g., 20%, 10%, 5%, etc.), then the communication module 560 may determine that the intent cannot be identified confidently. In such cases, the communication module 560 may ask the user to provide the utterance again, or may provide a guidance/confirmation question (e.g., "You said you want to move soon, correct?).

In other embodiments, instead of, or in addition to, the neural network model 600, the communication module 560 may include any of other types of model. In some embodiments, the model may include program instructions, commands, scripts, parameters (e.g., feature extraction parameters), etc. Also, in some embodiments, the model may be in a form of an application.

As discussed, the communication module 560 is configured to communicate with the user to simulate a person conversing with the user in order to train the user to communicate in a certain subject matter. Such may be accomplished by a processing module 620 using output from the neural network model 600 based on an algorithm in some embodiments. The processing module 620 may be coupled downstream with respect to the neural network model 600. Thus, the processing module 620 receives output from the neural network model 600 as input. In some embodiments, the algorithm utilized by the processing module 620 includes one or more rules associating intents with different conversational topics. Also, in some embodiments, a conversational topic may have a plurality of possible predefined responses and/or data-driven responses associated with a certain intent. Thus, in some embodiments, the neural network model 600 of the communication module 560 may be configured to identify a certain intent from a communication input by the user, and based on such identified intent, the processing module 620 may then utilize the algorithm to determine a communication topic relating to the identified intent, and to select a response from a plurality of predefined responses and/or data-driven responses under the communication topic.

The processing module 620 may be implemented using hardware, software, or a combination of both. In some embodiments, the processing module 620 may include one or more processors (e.g., signal processor(s), FPGA processor(s), ASIC processor(s), general purpose processor(s), etc.). The one or more processors may implement one or more modules that are configured to perform certain specific functions for the processing module 620. The one or more processors may be connected to each other physically, or may be in communication with each other wirelessly or through the Internet. Thus, components of the processing module 620 may be located in different locations. In other embodiments, the processing module 620 may be any integrated circuit having at least some hardware. In further embodiments, the processing module 620 may include one or more software or application modules. The one or more software or application modules may be run on one or more electronic devices, such as one or more computers (which may be communicatively coupled by cables and/or wirelessly), one or more servers (which may be communicatively coupled by cables and/or wirelessly), etc.

As shown in FIG. 6, in some embodiments, the communication module 560 may optionally also include a machine learning model 630. The machine learning model 630 is configured to perform machine learning based on input data sets. In the illustrated embodiments, the neural network model 600 and the machine learning model 630 are configured to process different types of data to determine different respective communication parameters. For example, the neural network model 600 may be configured to process audio data (e.g., speech data) to determine conversational intent, and the machine learning model 630 may be configured to process sensor data (e.g., depth sensor data, motion data, camera data, etc.) to determine facial expression, gesture, etc. In some cases, the machine learning model may be configured to process data from a machine perception and Perceptual User Interface (PUI) system. In other embodiments, the neural network model 600 may include the machine learning model 630, in which cases, the machine learning model 630 is a part of the neural network model 600.

In some embodiments, the communication module 560 may be stored in a server, and may be accessible by one or more users via respective end-user devices. In other embodiments, the communication module 560 may be transmitted from the server to one or more end-user devices for storage in the form of an application. In one implementation, a user may download an application that includes the communication module 560. In such cases, the neural network model 600 and/or the algorithm will be stored in the end-user device. Periodically, when the neural network model 600 in the server is updated, the updated neural network model 600 may then be sent to the end-user device. Such may be accomplished in response to a user accepting an update request, or may be accomplished by pushing the updated neural network model 600 to the end-user device without the user's input.

Figure 7:
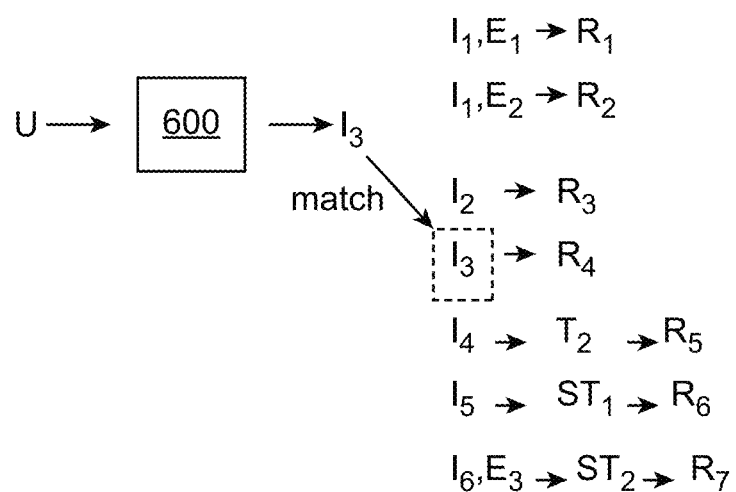
FIG. 7 illustrates an example of an algorithm for determining what to communicate with a user of a chatbot in a training session with the user.

FIG. 7 illustrates an example of a technique of determining what to communicate with a user of a chatbot in a training session with the user. As shown in the figure, the neural network model 600 processes an utterance U provided by a user during a conversation in topic $T_1$, and determines that the utterance U indicates an intent $I_3$. The communication module 560 then access an algorithm (which may be an example of the algorithm utilized by the processing module 620) for the topic $T_1$, which includes pre-defined and/or data-driven rules associating different intents with pre-defined and/or data-driven responses. As shown in the example, according to the algorithm, if the utterance indicates intent $I_1$, with entity $E_1$, then response $R_1$ is to be provided by the communication module 560 for responding to the user's utterance. If the utterance indicates intent $I_1$ with entity $E_2$, then response $R_2$ is to be provided by the communication module 560 for responding to the user's utterance. If the utterance indicates intent $I_2$, then response $R_3$ is to be provided by the communication module 560 for responding to the user's utterance. If the utterance indicates intent $I_3$, then response $R_4$ is to be provided by the communication module 560 for responding to the user's utterance. If the utterance indicates intent $I_4$, then the communication module 560 will go into topic $T_2$, and will provide response $R_5$ for responding to the user's utterance. If the utterance indicates intent $I_5$, then the communication module 560 will go to sub-topic $ST_1$, and will provide response $R_6$ for responding to the user's utterance. If the utterance indicates intent 16, then the communication module 560 will go to sub-topic $ST_2$, and will provide response $R_7$ for responding to the user's utterance. The algorithm utilized by the processing module 620 may include additional algorithms for different topics (e.g., topic $T_2$, etc.) and/or sub-topics (e.g., $ST_1$, $ST_2$, etc.), and these additional algorithms has similar rules like those shown in FIG. 7. Thus, if the communication module 560 goes to topic $T_2$ for example, then the communication module 560 will access the algorithm for the topic $T_2$ to determine what response to provide based on the rules set up in that algorithm. The same goes for the sub-topics.

In some embodiments, after a subtopic is finished, the communication module 560 may resume back to a previous conversation (e.g., a previous topic), unless another subtopic was initiated. In one implementation, the communication module 560 is configured to keep track of the topics and sub-topics, and provide communication output based on the tracked topics and sub-topics, so that the interaction with the user stays within certain area, and will not wander off to some unrelated topics.

In the illustrated example, the neural network model 600 determines that the utterance U indicates intent $I_3$, and the communication module 560 then selects response $R_4$ for responding to the user based on the rule set up in the algorithm.

In the above example, there is one pre-defined or data-driven response for each rule in the algorithm. In other embodiments, there may be multiple pre-defined and/or data-driven responses for each rule in the algorithm. For example, in other embodiments, the algorithm for the topic $T_1$ may have rule $I_3 \rightarrow R_{4,1}$, $R_{4,2}$, $R_{4,3}$ as possible pre-defined and/or data-driven responses. In such cases, if the neural network model 600 determines that the user's utterance U indicates intent $I_3$, then the communication module 560 may randomly select one of the responses $R_{4,1}$, $R_{4,2}$, $R_{4,3}$ for presentation to the user.

Also, in some embodiments, there may be multiple pre-defined and/or data-driven responses corresponding to different respective difficulty levels for each rule in the algorithm. For example, the algorithm for the topic T1 may have rule $I_2 \rightarrow R_{3,1,D1}$, $R_{3,2,D1}$, $R_{3,4,D2}$. In such cases, if the neural network model 600 determines that the user's utterance U indicates intent 12, and if the training has difficulty level of D1, then the communication module 560 may randomly select one of the two responses $R_{3,1,D1}$, $R_{3,2,D1}$ for presentation to the user. On the other hand, if the training has difficulty level of D2, then the communication module 560 may select response $R_{3,4,D2}$ for presentation to the user. In other embodiments, there may be one algorithm for a difficulty level for a certain topic (e.g., topic $T_1$), and another algorithm for another difficulty level for the same topic (e.g., topic $T_1$).

It should be noted that a pre-defined response may be a pre-defined complete response or a pre-defined partial response. For example, a pre-defined response may have a place-holder for inserting information that may be obtained from previous conversation with the user and/or from the research module 566.

In other embodiments, the algorithm may have one or more rules associating intents and entities with pre-defined and/or data-driven topics (which may comprise one or more pre-defined responses, and/or one or more data-driven responses). For example, in some cases, a conversational topic may have a plurality of possible pre-defined and/or data-driven responses associated with a certain intent and entity (or entities). Thus, in some embodiments, the neural network model 600 of the communication module 560 may be configured to identify a certain intent and entity (or entities) from a communication input by the user, and based on such identified intent and entity (or entities), the processing module 620 may then utilize the algorithm to determine a communication topic relating to the identified intent and entity (or entities), and to select a response from a plurality of pre-defined and/or data-driven responses under the communication topic.

In further embodiments, the algorithm may have one or more rules associating intents, entities, and/or stories with pre-defined and/or data-driven topics (which may comprise one or more pre-defined responses and/or one or more data-driven responses). For example, in some cases, a conversational topic may have a plurality of possible pre-defined and/or data-driven responses associated with a certain story. The story may be identified by the neural network model 600, and/or by the processing module 620 based on output by the neural network model 600. In some embodiments, the communication module 560 may then utilize the algorithm to determine a communication topic relating to the story, and to select a response from a plurality of pre-defined and/or data-driven responses under the communication topic.

As discussed, in some embodiments, the evaluator 562 is configured to evaluate a performance of the user. In one implementation, different responses (e.g., $R_1$, $R_2$, etc., shown in FIG. 7) may have different scores assigned therewith. In such cases, the evaluator 562 is configured to keep track of what responses have been provided to the user, and calculate an evaluation score based on the scores of the respective responses provided. For example, the evaluator 562 may sum all of the scores associated with respective responses given to the user. In some embodiments, if a user reaches a communication state in which a less desirable response R is provided by the communication module 560, but because the user persisted and tried different techniques to ultimately reach a desirable response, the evaluator 562 may take this into account when generating the score, and awards the user for the persistence.

Also, as discussed with reference to FIG. 5, in some embodiments, the processing unit 510 may be configured to determine the communication output for responding to the user also based on a level of difficulty at which the user is being trained. In some embodiments, such may be accomplished by the processing module 620 of FIG. 6. In particular, the product 500 may include a plurality of pre-defined responses and/or data-driven responses associated with different respective levels of difficulties in a certain subject area, or in certain topic of a subject area. For example, response R1 may be associated with difficulty level DL1, and response R2 may be associated with difficulty level DL2 that is more difficult that difficulty level DL1. In such cases, based on the intent identified by the neural network model 600, the communication module 560 may utilize the algorithm to determine what topic is associated with the identified intent, and to what are the different possible responses under the topic. If the user is being trained under difficulty level DL1, the algorithm may then select a response that is under this difficulty level for presentation to the user. In some embodiments, there may be different pre-defined and/or data-driven responses under each difficulty level. In such cases, the algorithm may randomly select one of the pre-defined and/or data-driven responses under the appropriate difficulty level.

Methods

Figure 9:
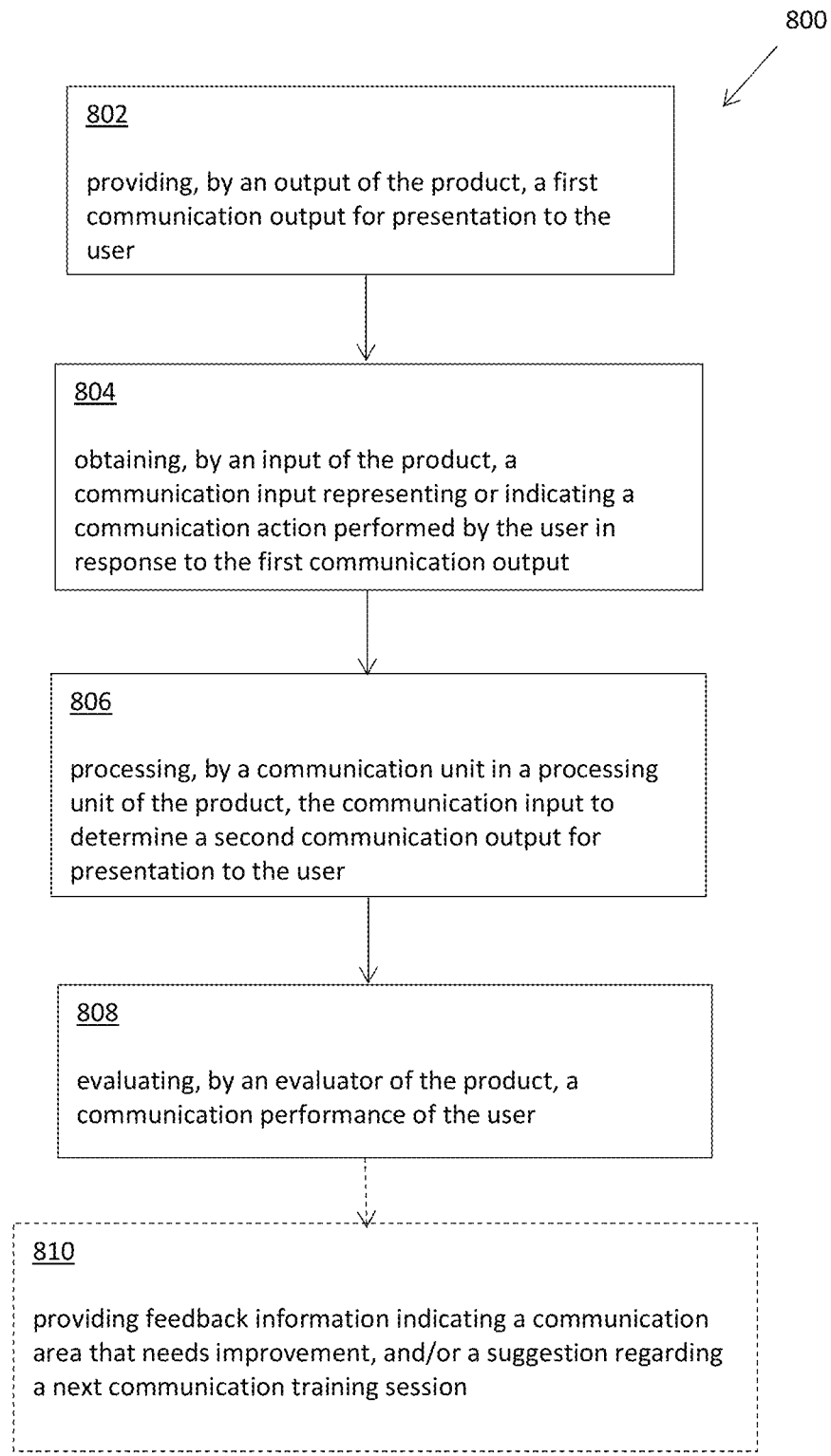
FIG. 9 illustrates a method in accordance with some embodiments.

FIG. 9 illustrates a method 800 performed by the product 500 of FIG. 5 in accordance with some embodiments. The method 800 is performed by a product to train a user to communicate in a subject area, and includes: providing, by an output of the product, a first communication output for presentation to the user during a training session (item 802); obtaining, by an input of the product, a communication input representing or indicating a communication action performed by the user in response to the first communication output during the training session (item 804); processing, by a communication module in a processing unit of the product, the communication input to determine a second communication output for presentation to the user during the training session (item 806); and evaluating, by an evaluator of the product, a communication performance of the user (item 808).

In some embodiments, the method 800 may optionally further includes providing feedback information indicating a communication area that needs improvement, and/or a suggestion regarding a next communication training session (item 810). The providing of the feedback information may be performed by the feedback module 578 described above.

It should be noted that the term "first communication output" is not necessarily the first communication output in the sense of an order, and that the product may provide one or more communication output before the "first communication output". Similarly, the term "second communication output" is not necessarily the second communication output in an order. As used in this specification, terms like "first", "second", etc. are used to identify different items, and they do not convey order unless stated otherwise.

Also, the phrase "a communication action performed by the user in response to the first communication output" is not limited to a communication action that responds to the first communication output in content or substance, and may refer to any action (verbal or non-verbal action) that is performed after the first communication output is provisioned, regardless whether the communication action actually responds to the content of the first communication output or not. Thus, the communication action may be "in response to" the first communication output in the sense that the communication action is performed because it is the user's turn to communicate after the first communication output has been provisioned.

Optionally, in the method 800, the communication module comprises a neural network model and/or a machine learning model, and wherein the act of processing the communication input to determine the second communication output is performed by the neural network model and/or the machine learning model.

Optionally, in the method 800, the neural network model and/or the machine learning model is trained based on a data set having a set of words associated with a communicational intent.

Optionally, in the method 800, the second communication output is determined by obtaining a metric indicating a probability of an intent based on the communication input, and determining the second communication output based on the metric.

Optionally, in the method 800, the second communication output is determined based on the metric and an algorithm that comprises a set of pre-defined and/or data-driven rules.

Optionally, in the method 800, the product is configured to role-play with the user without a presence of a human trainer.

Optionally, in the method 800, the act of processing the communication input comprises determining an intent of the user based on the communication input.

Optionally, in the method 800, the second communication output is for responding to the user, and wherein the second communication output is based on the determined intent of the user.

Optionally, in the method 800, the second communication output for responding to the user is determined also based on a level of difficulty at which the user is being trained.

Optionally, in the method 800, the act of evaluating comprises determining a metric indicating the communication performance of the user.

Optionally, in the method 800, the metric is determined based on a degree of coverage of topics in the subject area.

Optionally, in the method 800, the metric is determined based on whether a state of a communication between the user and the product satisfies a pre-defined or data-driven criterion.

Optionally, in the method 800, the act of providing the first communication output is performed to simulate a person to interact with the user.

Optionally, in the method 800, the person is a property owner, and the product is configured to simulate the property owner to interact with the user, and wherein the product is configured to train the user as a real estate agent to interact with the property owner.

Optionally, in the method 800, the person is a real estate agent, and the product is configured to simulate the real estate agent to interact with the user, and/or to show the user how a model real estate agent responds to one or more situations.

Optionally, the method 800 further includes providing, by a graphic generator, an image simulating an environment of a property.

Optionally, the method 800 further includes providing a user interface for allowing a real-estate agent, a real-estate broker, or a real-estate agent trainer, to configure the product.

Optionally, in the method 800, the subject area includes one or more topics selected from the group consisting of: pre-qualifying a potential client, listing presentation, objections handling, just-listed solicitation, just-sold solicitation, open-house conversation, for-sale-by-owner conversation, expired-listing conversation, lead generation, business development, and a transaction-related topic.

Optionally, in the method 800, the act of providing the first communication output is performed to simulate a school teacher, a parent, a counselor, or an individual who is interested in passing some knowledge.

Optionally, in the method 800, the product is configured to train the user as a student in a grade level that is anywhere from kindergarten to 12th grade.

Optionally, in the method 800, the subject area is an academic subject.

Optionally, in the method 800, the subject area is a non-academic subject.

Optionally, in the method 800, in a first mode of operation, the product is configured to simulate a first person in a first role to interact with the user in a second role; and wherein in a second mode of operation, the product is configured to simulate a second person in the second role to interact with the user in the first role.

Optionally, in the method 800, the product is configured to simulate multiple persons in different respective roles to interact with the user during the training session.

Optionally, in the method 800, the product is configured to simulate a person to interact with the user and another user during the training session.

Optionally, in the method 800, the product is configured to simulate multiple persons in different respective roles to interact with multiple users during the training session.

Optionally, the method 800 further includes generating, by a speech generator, speech signals based on the second communication output.

Optionally, the method 800 further includes generating, by a gesture generator, gesture signals based on the second communication output.

Optionally, the method 800 further includes searching the Internet, by a research module, and assembling relevant training information for training the user in the subject area.

Optionally, in the method 800, the act of searching the Internet is performed based on the communication input.

Optionally, in the method 800, the Internet is searched for information based on a locality related to the user.

Optionally, the method 800 further includes learning, by the communication module, to interact with the user in the subject area.

Optionally, the method 800 further includes providing a user interface for allowing an administrator or the user to create the communication module and/or to update the communication module.

Optionally, the method 800 further includes updating the communication module based on news, location of the user, an environment around the user, or any combination of the foregoing.

Optionally, in the method 800, the first communication output, the communication input, and the second communication output form an interaction between the user and the product, and wherein the method further comprises recording, by a recorder, the interaction.

Optionally, in the method 800, the interaction comprises a conversation between the user and the product, and wherein the act of recording the interaction comprises recording the conversation.

Optionally, the method 800 further includes generating a script of the recorded conversation.

Optionally, the method 800 further includes playing back the recorded interaction.

Optionally, the method 800 further includes monitor, by a progress monitor, a training progress of the user.

Optionally, the method 800 further includes correlating the training progress with a business parameter.

Optionally, in the method 800, the business parameter is revenue contributed by the user or sales funnel information, and wherein the act of correlating the training progress with the business parameter comprises correlating the training progress of the user with the revenue contributed by the user or with the sales funnel information.

Optionally, in the method 800, the communication action comprises a speaking action, and the communication input comprises an audio signal representing speech associated with the speaking action.

Optionally, in the method 800, the communication action comprises a speaking action, and the communication input comprises text derived from speech associated with the speaking action.

Optionally, in the method 800, the communication action comprises a making of a gesture, and the communication input comprises an image or a classification indicating the gesture.

Optionally, the method 800 further includes communicating with a speaker, a display, a virtual reality device, an augmented reality device, or any combination of the foregoing.

Optionally, in the method 800, the product comprises a communicational artificial intelligence system, and wherein the method is performed by the communicational artificial intelligence system.

Optionally, in the method 800, the product is a chatbot, and wherein the method is performed by the chatbot.

Optionally, in the method 800, the product is an Internet-of-Things (IoT) device, a robot, a toy, or an elderly-assist device; and wherein the method is performed by the IoT device, the robot, the toy, or the elderly-assist device.

Optionally, in the method 800, the product is implemented in a server, and wherein the method is performed by the server.

Optionally, in the method 800, the product is implemented in a hand-held device, and wherein the method is performed by the hand-held device.

Optionally, in the method 800, the product is implemented in a wearable device (e.g., virtual reality device, augmented reality device, neck-loop, helmet, etc.), and wherein the method 800 is performed by the wearable device.

Optionally, the method 800 further includes providing feedback information indicating a communication area that needs improvement, and/or a suggestion regarding a next communication training session.

In some embodiments, a processor-readable non-transitory medium is provided. The non-transitory medium stores a set of instructions, an execution of which will cause the method 800 to be performed.

A product includes a non-transitory medium storing a set of instructions, an execution of which will cause a method to be performed, the method comprising: providing, by an output, a first communication output for presentation to the user during a training session; obtaining, by an input, a communication input representing or indicating a communication action performed by the user in response to the first communication output during the training session; processing, by a communication module, the communication input to determine a second communication output for presentation to the user during the training session; and evaluating, by an evaluator, a communication performance of the user.

Figure 10:
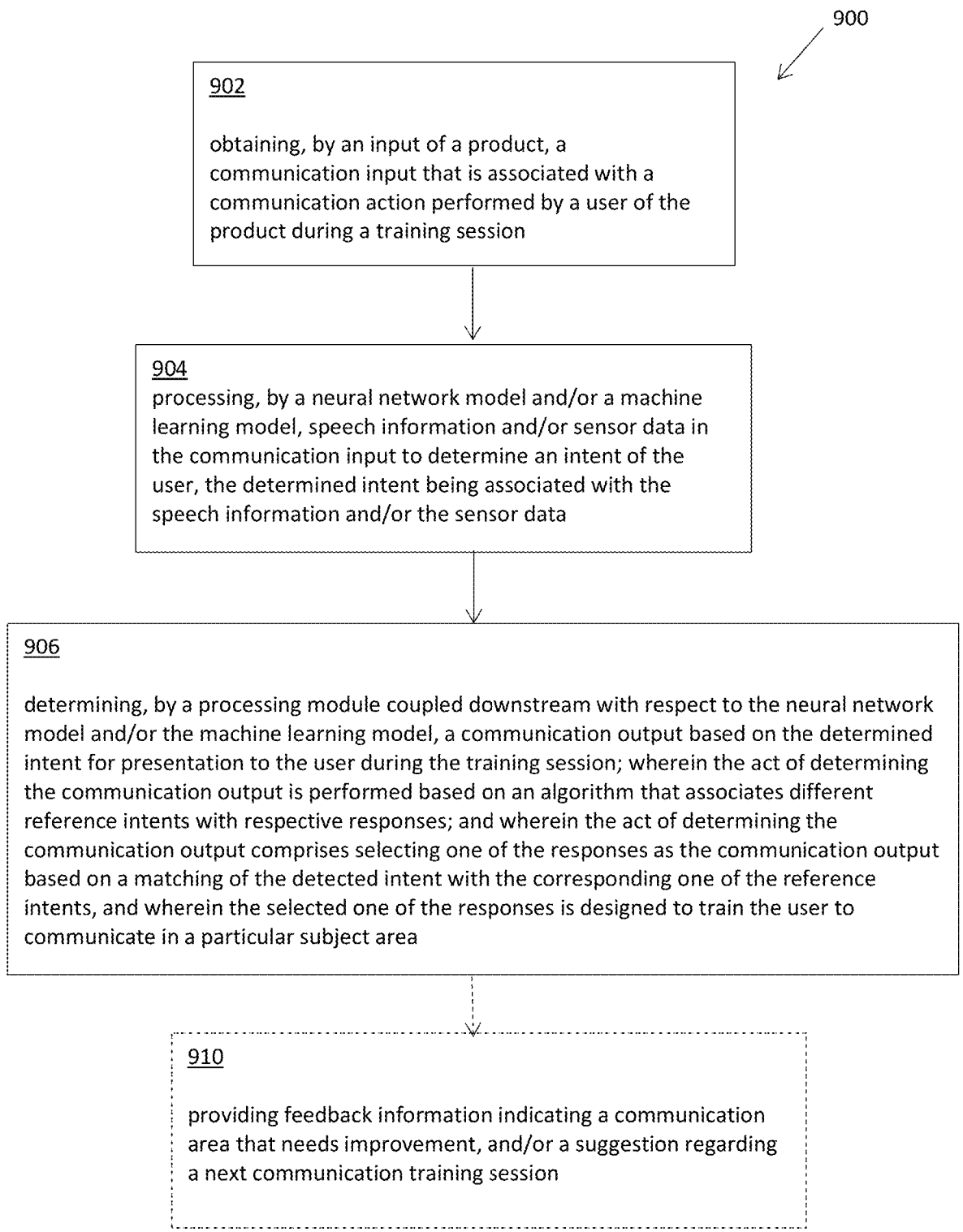
FIG. 10 illustrates another method in accordance with some embodiments.

FIG. 10 illustrates another method 900 performed by the product 500 of FIG. 5 in accordance with some embodiments. The method 900 is a communication training method performed by a product to train a user to communicate in a subject area, and includes: obtaining, by an input of a product, a communication input that is associated with a communication action performed by a user of the product during a training session (Item 902); processing, by a neural network model and/or a machine learning model, speech information and/or sensor data in the communication input to determine an intent of the user, the determined intent being associated with the speech information and/or the sensor data (Item 904); and determining, by a processing module coupled downstream with respect to the neural network model and/or the machine learning model, a communication output based on the determined intent for presentation to the user during the training session (Item 906); wherein the act of determining the communication output is performed based on an algorithm that associates different reference intents with respective responses; and wherein the act of determining the communication output comprises selecting one of the responses as the communication output based on a matching of the detected intent with the corresponding one of the reference intents, and wherein the selected one of the responses is designed to train the user to communicate in a particular subject area.

In some embodiments, the method 900 may optionally further includes providing feedback information indicating a communication area that needs improvement, and/or a suggestion regarding a next communication training session (item 910). The providing of the feedback information may be performed by the feedback module 578 described above.

Optionally, in the method 900, the communication training product comprises both the neural network model and the machine learning model.

Optionally, in the method 900, the speech information is processed by the neural network model.

Optionally, in the method 900, the sensor data comprises non-audio data, and wherein the sensor data is processed by the machine learning model.

Optionally, the communication training method 900 further includes determining, by an evaluator, a metric indicating a communication performance of the user.

Optionally, in the method 900, the metric is determined based on a degree of coverage of topics in the subject area.

Optionally, in the method 900, the metric is determined based on whether a state of a communication between the user and the product satisfies a pre-defined or data-driven criterion.

Optionally, the communication training method 900 further includes searching, by a research module, the Internet, and assembling relevant training information for training the user in the subject area.

Optionally, in the method 900, the communication output and the communication input form an interaction between the user and the communication training product, and wherein the method 900 further comprises recording the interaction.

Optionally, product comprises a communicational artificial intelligence system, and wherein the communication training method 900 is performed by the communicational artificial intelligence system.

In some embodiments, a processor-readable non-transitory medium is provided. The non-transitory medium stores a set of instructions, an execution of which will cause the method 900 to be performed.

A product includes a non-transitory medium storing a set of instructions, an execution of which will cause a method to be performed, the method comprising: obtaining, by an input of a product, a communication input that is associated with a communication action performed by a user of the product during a training session; processing, by a neural network model and/or a machine learning model, speech information and/or sensor data in the communication input to determine an intent of the user, the determined intent being associated with the speech information and/or the sensor data; and determining, by a processing module coupled downstream with respect to the neural network model and/or the machine learning model, a communication output based on the determined intent for presentation to the user during the training session; wherein the act of determining the communication output is performed based on an algorithm that associates different reference intents with respective responses; and wherein the act of determining the communication output comprises selecting one of the responses as the communication output based on a matching of the detected intent with the corresponding one of the reference intents, and wherein the selected one of the responses is designed to train the user to communicate in a particular subject area.

Specialized Processing System

Figure 11:
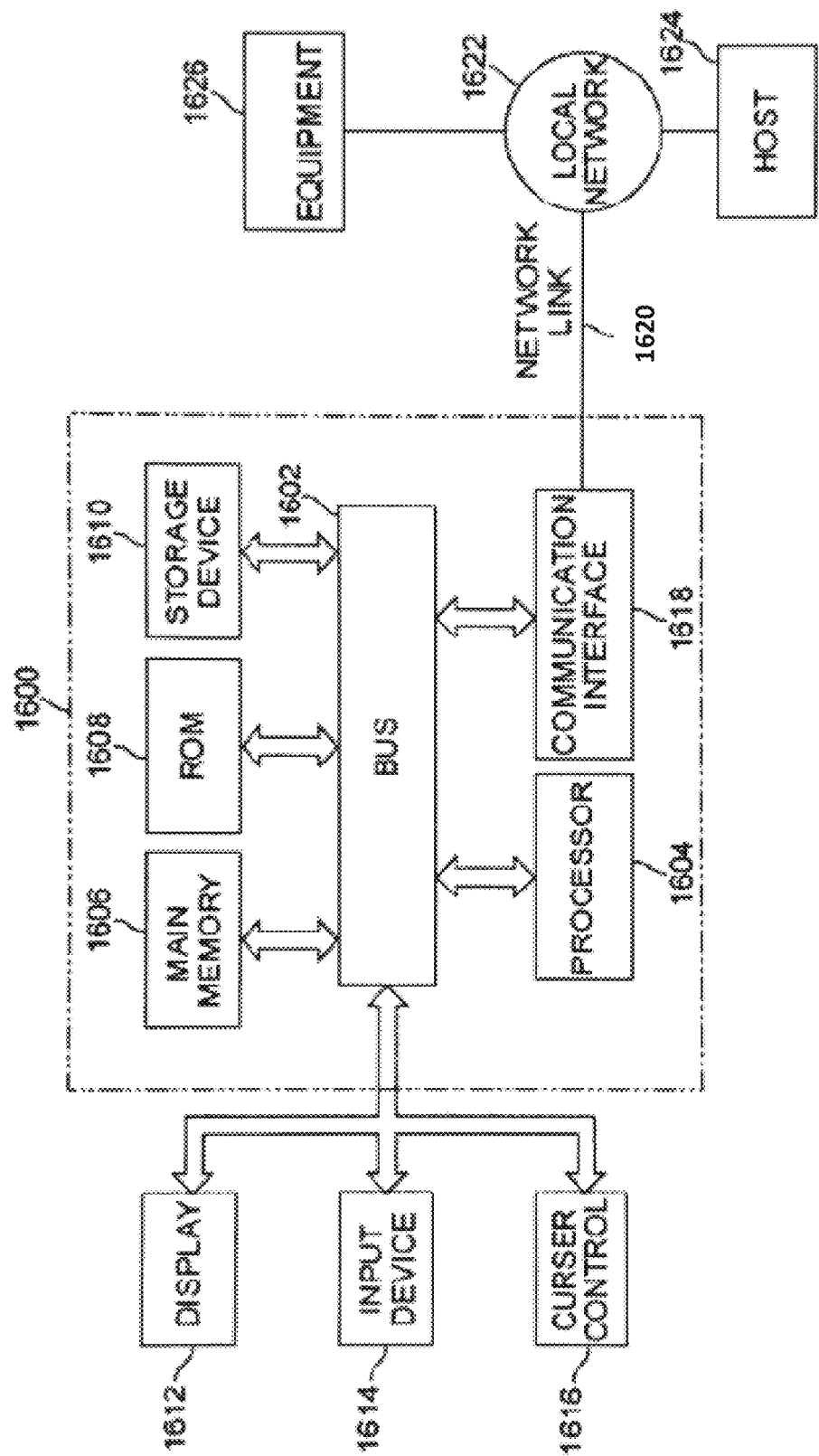
FIG. 11 illustrates a specialized processing system for implementing one or more electronic devices described herein.

FIG. 11 illustrates a specialized processing system for implementing one or more electronic devices described herein. For examples, the processing system 1600 may implement the product 500, or at least a part of the product 500, such as the processing unit 510 of the apparatus 500.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 1612, such as a screen or a flat panel, for displaying information to a user. An input device 1614, including alphanumeric and other keys, or a touchscreen, and/or any of other data capture devices (sensors), is coupled to the bus 1602 for communicating information and command selections to processor 1604. Another type of user input device is cursor control 1616, such as a 2D touchpad, a touchscreen, a trackball, or cursor direction keys for communicating direction information and command selections to processor 1604 and/or for controlling cursor movement on display 1612. This input device typically has two degrees of freedom in two axes, a first axis (e.g., x) and a second axis (e.g., y), that allows the device to specify positions in a plane. The input device 1614 and/or the cursor control device 1616 may be the same device in some embodiments. Also, the input device 1614 and/or the cursor control device 1616 may be any 2D input device or 3D input device.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, SD disks, such as the storage device 1610. A non-volatile medium may be considered an example of non-transitory medium. Volatile media includes dynamic memory, such as the main memory 1606. A volatile medium may be considered an example of non-transitory medium. Transmission media includes cables, wire and fiber optics, including the wires that comprise the bus 1602. Transmission media can also take the form of acoustic or light waves, such as those generated during radio wave and infrared data communications.

Common forms of processor-readable media include, for example, hard disk, a magnetic medium, a CD-ROM, any other optical medium, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a storage of a remote computer or remote device. The remote computer or device can send the instructions over a network, such as the Internet. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card to provide a data communication. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

As used in this specification, the term "product" may refer to any human-made and/or machine-made article/item. By means of non-limiting examples, the product may be an electronic device, a hardware and/or software component of an electronic device, an application in a cloud/server, etc.

As used in this specification, the term "chatbot" refers to any processing unit or component thereof that is configured to converse with a user. For example, in some embodiments, the chatbot may be a communication module of a processing unit, and the communication module may be implemented using hardware, software, or a combination of both. In addition, as used in this specification, the term "skills module" may also be any processing unit or component thereof that is configured to interact with a user (e.g., to generate signals, such as audio signals, visual signals, control signals for controlling a robot, an artificial limb, an artificial face, etc., or any combination of the foregoing). In some embodiments, a skills module is the same as a communication module.

Also, as used in this specification, the term "interact" or any of other similar terms (e.g., "interaction") may refer to any form of interaction (e.g., verbal communication, text communication, gestures, etc.). Similarly, the term "communicate" or any of other similar terms (e.g., "communication") may refer to any form of action performed to convey information (e.g., idea, intent, feeling, state of mind, etc.), including speaking, typing, making facial expression, gesturing, etc.

In addition, as used in this specification, the term "neural network model" refers to any computing unit, system, or module made up of a number of interconnected processing elements, which process information by their dynamic state response to input. In some embodiments, the neural network model may have deep learning capability, machine learning capability, and/or artificial intelligence. In some embodiments, the neural network model may be simply any computing element that can be trained using one or more data sets. Also, in some embodiments, the neural network model may be any type of neural network. By means of non-limiting examples, the neural network model may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

Furthermore, as used in this specification, the term "image" is not limited to an image that is displayed, and may refer to an image that is displayed or not displayed (e.g., an image in data or digital form that is stored). Also, the term "image" may refer to any 2D or 3D representation of object(s), or to any form that facilitates presentation of object(s) in a virtual reality, augmented reality, mixed reality, or extended reality setting.

In addition, as used in this specification, the term "model" may refer to one or more algorithms, one or more equations, one or more processing applications, one or more variables, one or more criteria, one or more parameters, or any combination of two or more of the foregoing. Also, the term "model" may in some embodiments cover machine learning model (such as neural network model), or components thereof, such as layers, interconnections weights, or any combination of the foregoing.

Also, as used in this specification, the term "machine learning model" may refer to any processing entity (e.g., module, application, program, processing architecture, etc.) that has machine learning capability and/or that is configured by machine learning. Neural network model is an example of machine learning model, and therefore, the term "machine learning model" is not limited to neural network model.

Also, as used in this specification, the term "signal" may refer to one or more signals. By means of non-limiting examples, a signal may include one or more data, one or more information, one or more signal values, one or more discrete values, etc.

Furthermore, it should be noted that the communication module/chatbot described herein is not limited to processing audio data provisioned by a speaking action of the user. In some embodiments, the communication module/chatbot described herein may be configured to process different types of data, such as sensor data, provisioned by action(s) of the user. For example, the communication module (e.g., the machine learning module, the neural network module, or another processing module) may be configured to process sensor data provisioned by the user during a training session in which the user interact with the communication module. By means of non-limiting examples, sensor data may include audio data (output by microphone that generates the audio data in response to sensed sound), non-audio data, such as: visual data (e.g., still image(s) and/or video), motion data (e.g., accelerometer signals), depth data from depth sensing device, data associated with PUI interface, etc.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. A product for training a user to communicate in a subject area, the product comprising:
    an output configured to provide a first communication output for presentation to the user to train the user to communicate in the subject area during a training session;
    an input configured to obtain a communication input representing or indicating a communication action performed by the user in response to the first communication output during the training session;
    a processing unit comprising a communication module configured to process the communication input to determine a second communication output for presentation to the user to train the user to communicate in the subject area during the training session; and
    an evaluator configured to evaluate a communication performance of the user, and to provide feedback for the user based on the evaluated communication performance of the user.

2. The product of claim 1, wherein the feedback comprises a numerical metric for presentation to the user, wherein the numerical metric is based on the evaluated communication performance of the user.

3. A communication training product, comprising:
    an input configured to obtain a communication input that is associated with a communication action performed by a user of the product during a training session to train the user to communicate in a subject area;
    a neural network model and/or a machine learning model configured to process speech information and/or sensor data in the communication input to determine an intent of the user, the determined intent being associated with the speech information and/or the sensor data; and
    a processing module coupled downstream with respect to the neural network model and/or the machine learning model, wherein the processing module is configured to determine a communication output based on the determined intent for presentation to the user to train the user to communicate in the subject area during the training session;
    wherein the processing module is configured to operate based on an algorithm that associates different reference intents with respective responses, and wherein the processing module is configured to select one of the responses as the communication output based on a matching of the detected intent with the corresponding one of the reference intents, and wherein the selected one of the responses is designed to train the user to communicate in the subject area.

4. The communication training product of claim 3, wherein the communication training product comprises both the neural network model and the machine learning model.

5. The communication training product of claim 4, wherein the neural network model is configured to process the speech information.

6. The communication training product of claim 5, wherein the machine learning model is configured to process the sensor data, and wherein the sensor data comprises non-audio data.

7. The communication training product of claim 3, further comprising an evaluator is configured to determine a metric indicating a communication performance of the user, and to provide the metric for presentation to the user.

8. The communication training product of claim 7, wherein the evaluator is configured to determine the metric based on a degree of coverage of topics in the subject area.

9. The communication training product of claim 7, wherein the evaluator is configured to determine the metric based on whether a state of a communication between the user and the product satisfies a pre-defined or data-driven criterion.

10. The communication training product of claim 3, further comprising a research module configured to search the Internet, and assemble relevant training information for training the user in the subject area.

11. The communication training product of claim 3, wherein the communication output and the communication input form an interaction between the user and the communication training product, and wherein the communication training product comprises a recorder configured to record the interaction.

12. The communication training product of claim 3, further comprising a feedback module configured to provide feedback information indicating a communication area that needs improvement, and/or a suggestion regarding a next communication training session.

13. The communication training product of claim 3, wherein the communication training product comprises a communicational artificial intelligence system.

14. The communication training product of claim 3, wherein the processing module is configured to determine the communication output for presentation to the user based on a level of difficulty at which the user is being trained.

15. The communication training product of claim 3, wherein the communication training product is configured to simulate a person to interact with the user.

16. The communication training product of claim 3, wherein the subject area is business, finance, technology, legal, retail, recruiting, medicine, dating, real estate, education, or any subject area for which training is needed.

17. The communication training product of claim 3, wherein in a first mode of operation, the communication training product is configured to simulate a first person in a first role to interact with the user in a second role; and
wherein in a second mode of operation, the communication training product is configured to simulate a second person in the second role to interact with the user in the first role.

18. The communication training product of claim 3, wherein the communication training product is configured to simulate multiple persons in different respective roles to interact with the user during the training session.

19. The communication training product of claim 3, wherein the communication training product is configured to simulate a person to interact with the user and another user during the training session.

20. The communication training product of claim 3, wherein the communication training product is configured to learn to interact with the user in the subject area.

21. The communication training product of claim 3, further comprising a progress monitor configured to monitor a training progress of the user.

22. The communication training product of claim 7, wherein the metric indicating a communication performance of the user comprises a numerical metric.

23. A communication training method, comprising:
obtaining, by an input of a product, a communication input that is associated with a communication action performed by a user of the product during a training session to train the user to communicate in a subject area;
processing, by a neural network model and/or a machine learning model, speech information and/or sensor data in the communication input to determine an intent of the user, the determined intent being associated with the speech information and/or the sensor data; and
determining, by a processing module coupled downstream with respect to the neural network model and/or the machine learning model, a communication output based on the determined intent for presentation to the user to train the user to communicate in the subject area during the training session;
wherein the act of determining the communication output is performed based on an algorithm that associates different reference intents with respective responses; and
wherein the act of determining the communication output comprises selecting one of the responses as the communication output based on a matching of the detected intent with the corresponding one of the reference intents, and wherein the selected one of the responses is designed to train the user to communicate in the subject area.

24. A product having a non-transitory medium storing a set of instructions, an execution of which will cause the method of claim 23 to be performed.

25. A communication training product, comprising:
an input configured to obtain a communication input that is associated with a communication action performed by a user of the product during a training session to train the user to communicate in a subject area;
a communication module configured to process the communication input to determine an intent of the user, and determine a communication output based on the determined intent for presentation to the user to train the user to communicate in the subject area during the training session; and
an evaluator configured to determine a communication performance of the user based at least in part on how well the user communicates in the subject area, a facial expression of the user detected during the training session, a gesture of the user detected during the training session, or any combination of the foregoing, wherein the communication training product is configured to provide feedback for the user based on the communication performance of the user.

26. A communication training method, comprising:
obtaining, by an input of a product, a communication input that is associated with a communication action performed by a user of the product during a training session to train the user to communicate in a subject area;
processing, by a communication module of the product, the communication input to determine an intent of the user;
determining a communication output based on the determined intent for presentation to the user to train the user to communicate in the subject area during the training session;
determining, by an evaluator of the product, a communication performance of the user based at least in part on how well the user communicates in a subject area, a facial expression of the user detected during the training session, a gesture of the user detected during the training session, or any combination of the foregoing; and
providing, by the product, feedback for the user based on the communication performance of the user.

27. A product having a non-transitory medium storing a set of instructions, an execution of which will cause the method of claim 26 to be performed.

* * * * *